United States Patent
Ochoa Hendrix et al.

(10) Patent No.: US 11,763,691 B1
(45) Date of Patent: Sep. 19, 2023

(54) METHOD AND LEARNING SYSTEM PLATFORM FOR EXTENDED REALITY DIGITAL HYBRID EDUCATION

(71) Applicant: Killer Snails LLC, Brooklyn, NY (US)

(72) Inventors: Jessica Ochoa Hendrix, Brooklyn, NY (US); Mandë Holford, Brooklyn, NY (US); Christopher Pollati, Brooklyn, NY (US); Noelle Posadas Shang, Brooklyn, NY (US); Corinne Brenner, Brooklyn, NY (US)

(73) Assignee: Killer Snails LLC, Brooklyn, NY (US)

( * ) Notice: Subject to any disclaimer, the term of this patent is extended or adjusted under 35 U.S.C. 154(b) by 0 days.

(21) Appl. No.: 17/960,395

(22) Filed: Oct. 5, 2022

Related U.S. Application Data

(60) Provisional application No. 63/364,320, filed on May 6, 2022.

(51) Int. Cl.
   *G09B 5/06* (2006.01)
   *G06T 19/00* (2011.01)

(52) U.S. Cl.
   CPC ............ *G09B 5/065* (2013.01); *G06T 19/006* (2013.01)

(58) Field of Classification Search
   CPC .............................. G09B 5/065; G06T 19/006
   See application file for complete search history.

(56) References Cited

U.S. PATENT DOCUMENTS

| | | | | |
|---|---|---|---|---|
| 11,024,190 | B1 * | 6/2021 | Henchy | G06Q 50/205 |
| 2010/0261150 | A1 * | 10/2010 | Matwick | G09B 5/00 |
| | | | | 434/350 |
| 2016/0148522 | A1 * | 5/2016 | Rowland | H04L 65/4015 |
| | | | | 434/362 |
| 2016/0350977 | A1 * | 12/2016 | Doronichev | G09B 5/065 |
| 2017/0221267 | A1 * | 8/2017 | Tommy | G09B 5/125 |
| 2017/0221371 | A1 * | 8/2017 | Yang | G06T 11/60 |
| 2018/0101988 | A1 * | 4/2018 | Murillo | G06F 3/011 |
| 2020/0051460 | A1 * | 2/2020 | Bedor | G09B 19/22 |
| 2022/0137701 | A1 * | 5/2022 | Bowman | G06F 3/165 |
| | | | | 345/156 |

OTHER PUBLICATIONS

Kaplan, Alexandra D. et al, The Effects of Virtual Reality, Augmented Reality, and Mixed Reality as Training Enhancement Methods: A Meta-Analysis, Human Factors and Ergonomics Society, 2020, pp. 1-20.

* cited by examiner

*Primary Examiner* — Jay Trent Liddle
*Assistant Examiner* — Alyssa N Brandley
(74) *Attorney, Agent, or Firm* — Inspired Idea Solutions Law Firm

(57) ABSTRACT

An integrated learning system provides for progressive education for children through a virtual world, an individualized journal and an educator dashboard with real time updates. The system includes an extended reality (XR) enabled device and a computer or tablet for the student(s), a remote server, and a computer for the instructor. The extended reality supports deeper learning and provides differentiated assessment via a dashboard that tracks movement within the system to measure learning and progress. The system updates in real time with the student's progress (responses, interactions, time spent on page), includes a teacher-student messaging system, and enables the student to re-enter the virtual environment at the same point or allow the student to progress to different points based upon events in the virtual environment or the outcomes of choices made in the digital journal.

20 Claims, 34 Drawing Sheets

Poster (Not to scale)

Team Name

Background
*Prompt: What is your group's goal?*

*Prompt: Add an image of the snail's anatomy here.*

*Prompt: Add an image...*

Methods
*Prompt: How did you get a sample of the venom?*
*Prompt: How did you filter and purify the venom?*
*Prompt: What did you do to find the components of venom?*
*Prompt: Add an image of the assay setup here.*

Hypotheses
*Prompt: Add your hypotheses here.*

Results
*Prompt: Which components of venom had an effect in the assay?*

*Prompt: Add a graph...*

Conclusion
*Prompt: Did your groups results meet your goal?*

METHOD AND LEARNING SYSTEM PLATFORM FOR EXTENDED REALITY DIGITAL HYBRID EDUCATION

FIELD

The present disclosure generally relates to extended reality (XR), and more particularly to educational learning which leverages extended reality.

BACKGROUND

Extended reality is difficult to define neatly, but has been approached in various academic studies and literature. For example, see "The effects of virtual reality, augmented reality, and mixed reality as training enhancement methods: A meta-analysis" in Human Factors: The Journal of the Human Factors and Ergonomics Society, by Kaplan, A. D., Cruit, J., Endsley, M., Beers, S. M., Sawyer, B. D., & Hancock, P. A. (pub. No. 001872082090422, 2020). Extended reality may be understood to refer to a computer generated environment, including sights and sounds, and hardware specifically designed to present this environment to us in a way that is interactive and immersive. In other words, it tricks the senses because to some extent it feels more real than a video game or a movie. Extended reality is the culmination of various earlier technologies, including the stereoscopic photos & viewers of the 1830's, early flight simulators of the 1920's, and the Morton Heilig Sensorama of the 1950s.

In the 1960s Morton Heilig invented the first head mounted display (HMD), providing stereoscopic 3D and wide vision with stereo sound. Yet Morton's HMD was non-interactive. In 1968, Ivan Sutherland and Bob Sproull create the first extended reality head mounted display, called the Sword of Damocles, which was connected to a computer rather than to a camera. Development of extended reality systems continued through the 1970's and 1980's, with many notable developments, not the least of which was Jaron Lanier's coining of the term "virtual reality" to describe the emerging space and the associated research. Lanier was also the first to sell virtual reality goggles (imagine a price tag of between $9,400 and $49,000 in 1987). Not long after this, both Sega (circa 1994) and Nintendo (circa 1995) attempted to launch a VR gaming system, but both flopped due to technical difficulties.

One of the primary technical difficulties with creating a truly immersive interactive experience in extended reality is achieving the processing power required to create and maintain the extended reality environment. Over the era of VR technological development, there were also great advances in computer hardware and software. Finally, in the period between about 2010 and about 2017, advancements in extended reality and computer processing power were melded to create the first commercially viable and extended reality systems. Primarily the application of choice for these systems has been gaming, however, private industry has been slowly catching onto the trend and extended reality is gaining steam throughout any number of industries, including education. In modern parlance, the term 'extended reality' has come to refer to all real-and-virtual combined environments and human-machine interactions generated by computer technology and wearables, and includes representative forms such as augmented reality, mixed reality, and virtual reality and the areas interpolated among them.

SUMMARY

A learning system comprises a server having software for operating the learning system, an XR enabled device capable of enabling a user to view and interact with an extended reality environment, the XR enabled device sending and receiving communications to and from the server, a student device capable of accessing and displaying a digital science journal, the student device sending and receiving communications to and from the server, an assessment device capable of accessing and displaying an educator dashboard; the assessment device sending and receiving communications to and from the server, wherein interactions occurring in the extended reality environment are communicated to the server as they occur, wherein interactions occurring in the digital science journal are communicated to the server as they occur, and wherein updates regarding interactions are polled by the assessment device and communicated from the server in real time.

A method of interactive learning comprises equipping a server with software for conducting interactive learning, activating an XR enabled device to view and interact with an extended reality environment, the XR enabled device sending and receiving communications to and from the server, activating a student device to view and interact with a digital science journal, the student device sending and receiving communications to and from the server, activating an assessment device to view and interact with an educator dashboard, the assessment device sending and receiving communications to and from the server, communicating interactions occurring in the extended reality environment to the server as they occur, communicating interactions occurring in the digital science journal to the server as they occur, and polling the server for updates regarding interactions and communicating the updates to the assessment device in real time.

A method of interactive learning comprises equipping a server with software for conducting interactive learning, activating an XR enabled device to view and interact with an extended reality environment, activating a student device to view and interact with a digital science journal, activating an assessment device to view and interact with an educator dashboard, communicating interactions occurring in the extended reality environment to the server, communicating interactions occurring in the digital science journal to the server, and polling the server for updates regarding interactions and communicating the updates to the assessment device.

BRIEF DESCRIPTION OF THE DRAWINGS

Various aspects and advantages will become apparent upon review of the following detailed description and upon reference to the drawings in which:

FIG. 21 illustrates a screenshot of an extended reality education system;

FIG. 22 illustrates a screenshot of an extended reality education system;

FIG. 40 illustrates a screenshot of an extended reality education system.

DETAILED DESCRIPTION

The following disclosure includes a method and system for integrated learning through an extended reality education system. This integrated learning system platform is based upon a progressive method of learning which leverages extended reality and an individualized digital student journal-which is fed into a teacher dashboard. The extended reality may include one or more of augmented reality, mixed reality, and virtual reality. The integrated learning system may employ the use of educational modules containing topic-based interactive learning.

In an example embodiment there are three main components: 1) extended reality (XR) scenes (e.g., interacting with mako sharks or milking venomous marine snails, 2) a digital science journal that reflects XR gaming interactions, provides interactive tools to manipulate, constructs models, develops hypotheses and features citizen science challenges, and 3) a real-time educator assessment dashboard that displays student's XR manipulations, scaffolding questions, and scientific content information.

Figure 1:
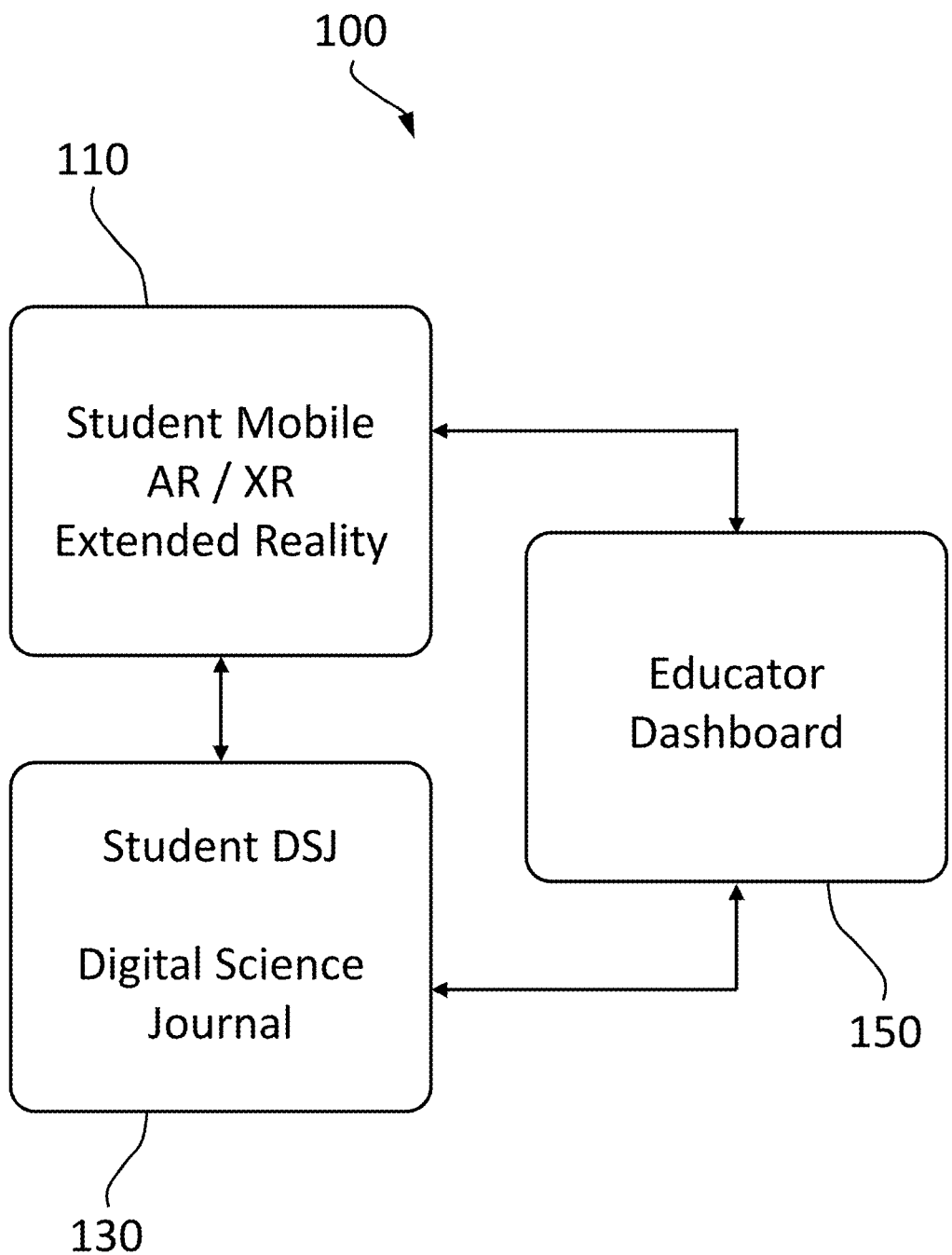
FIG. 1 illustrates a system diagram of an extended reality education system.

FIG. 1 illustrates a system diagram of an extended reality education system 100. The education system 100 combines extended reality 110 with an individual student journal, or digital science journal 130, which is then supported by a teacher/educator dashboard 150. The extended reality 110 may provide authentic science activities, support active role as a scientist, and may support collaboration. The digital science journal 130 may scaffold activities, support active role as a scientist, support collaboration, and represent diverse scientists. The educator dashboard 150 may display real-time analytics from the digital science journal 130 and/or the extended reality 110, provide immediate feedback on the students' progress and questions, and offer insight into collaborative learning processes.

Extended reality education system 100 may help students to increase their science self-efficacy, develop a STEM identity, and/or increase the number and quality of their collaborative interactions as part of the integrated learning experience. Further, extended reality education system 100 may improve student's science and engineering practices, especially collaboration, and may increase student interest in STEM studies and careers.

Extended reality education system 100 may help educators increase familiarity with extended reality and digital tools, improve educators' ability to monitor collaborative processes, and engage in clear educator-student communication. Further, extended reality education system 100 may improve implementation of extended reality in classrooms, improve support for collaboration in classrooms, and improve classroom instruction.

Figure 2:
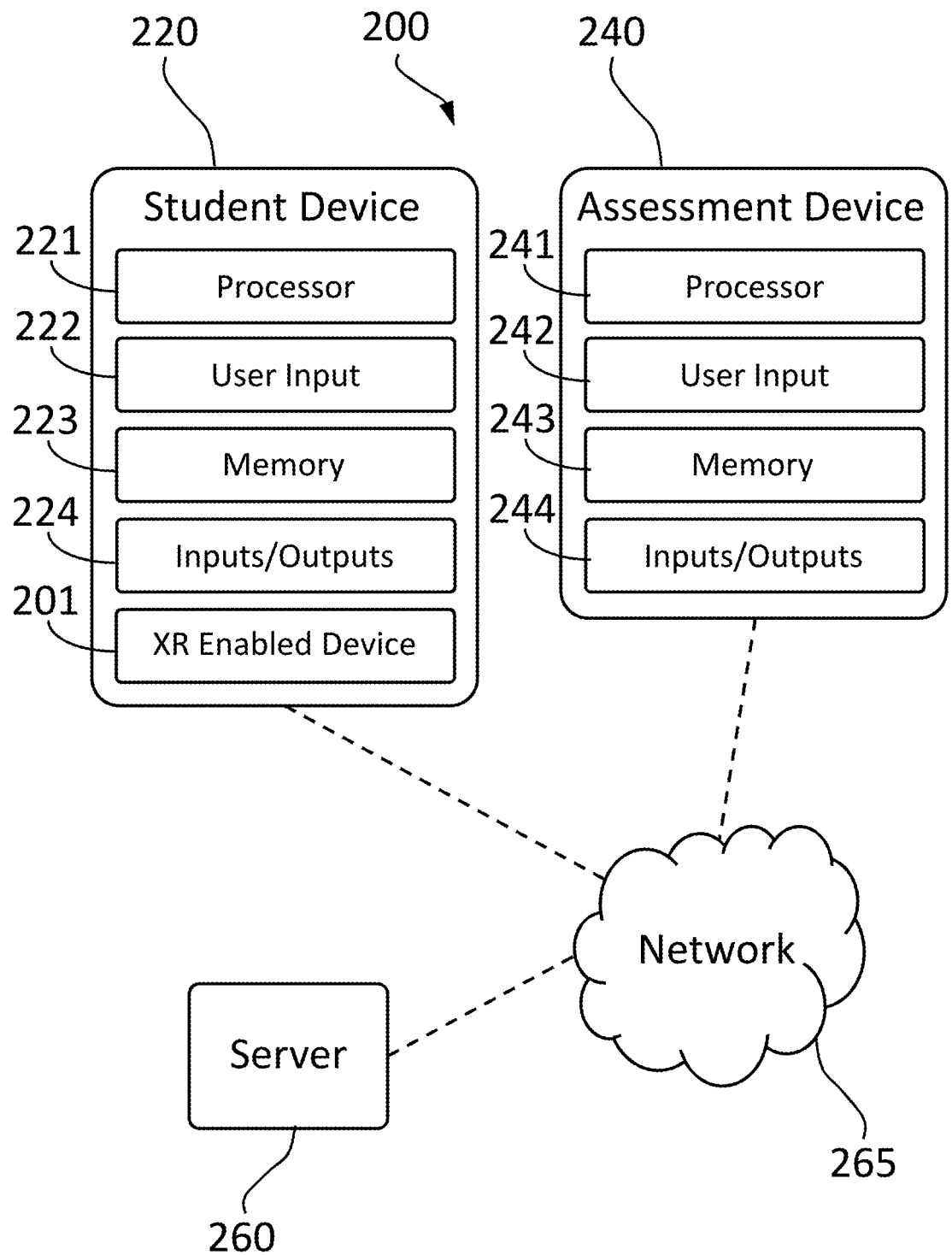
FIG. 2 illustrates a system diagram of an extended reality education system.

FIG. 2 illustrates a system diagram of an extended reality education system 200 having the hardware necessary to achieve integrated learning (e.g., to implement extended reality education system 100 of FIG. 1). Extended reality education system 200 may include a student device 220, an assessment device 240, and a server 260. Student device 220, assessment device 240, and server 260 may communicate with each other through a network 265.

Network 265 may be a wired and/or wireless network. It is conceivable that student device 220, assessment device 240, and server 260 are located in close vicinity to each other such that wired communication is possible. However, one or more of student device 220, assessment device 240, and server 260 may be located remotely from the others, and therefore network 265 may be a wireless network as understood by a person of ordinary skill in the art (e.g., having various modems, routers, and other relays to pass communications between student device 220, assessment device 240, and server 260). The use of "communication" or any derivative thereof may be understood to refer to data transmission between electronic devices.

Student device 220 may be any electronic device or smart device capable of integrating with the extended reality education system 200. Student device 220 may have a processor 221, a user input 222, a memory 223, and inputs and/or outputs 224. Further, assessment device 240 may have a processor 241, a user input 242, a memory 243, and inputs and/or outputs 244. While not illustrated, it is understood that server 260 may be equipped with one or more of a processor, a user input, a memory, and inputs and/or outputs to facilitate communication and operability within the extended reality education system 200. Student device 220 may also be equipped with an XR enabled device 201 which relies on and is operable only with the other subcomponents of student device 220 (e.g., the XR enabled device 201 utilizes processor 221 and/or memory 223 for generation of an extended reality environment).

Server 260 may include a memory which contains software (e.g., programs and other operating information) forming the basis of the extended reality education system 200. Software may define the qualities, characteristics, and appearance of an extended reality environment, a digital science journal, and an educator dashboard. Further, software may define the features and functions thereof, such as how communication is passed between components of the system (e.g., API calls over network 265), when communications are passed, and/or the frequency thereof.

Student device 220 may be utilized by a user (e.g., a student) to access the user's digital science journal (e.g., digital science journal 130 of FIG. 1). Inputs and outputs 224 of student device 220 and of server 260 may facilitate communication via network 265. Processor 221 may process, compute, or otherwise analyze communications from server 260. Memory 223 may store some or all of the communications from server 260, and further may store some or all of software from server 260 (e.g., enough programs or other operating information to facilitate the user's interactions with the digital science journal). User input 222 may enable the user to interact with the digital science journal. User inputs 222 may include one or more of a mouse, keyboard, controller, clicker, buttons, touch screen, or other known user interface for facilitating user interaction with electronic devices and smart devices.

Further, where the XR enabled device 201 relies on and is operable only with the other subcomponents of student device 220, student device 220 may be utilized by a user to access the extended reality environment (e.g., such as where an extended reality headset is the XR enabled Device 201 and is coupled for communication with a desktop computer, and the desktop computer is student device 220). Thus, the extended reality environment may be created using the processing power of processor 221 and memory 223, and may be viewable by the user by means of XR enabled device 201, and where the user may interact with the extended reality environment by means of user input 222 or by means of secondary user inputs associated with XR enabled device 201 (e.g., controllers with clickers and/or tappable buttons).

Assessment device 240 may be utilized by a user (e.g., a teacher) to access the user's educator dashboard (e.g., educator dashboard 150 of FIG. 1). Inputs and outputs 244 of assessment device 240 and of server 260 may facilitate communication via network 265. Processor 241 may process, compute, or otherwise analyze communications from server 260. Memory 243 may store some or all of the communications from server 260, and further may store some or all of software from server 260 (e.g., enough programs or other operating information to facilitate the user's interactions with the educator dashboard). User input 242 may enable the user to interact with the educator dashboard. User inputs 242 may include one or more of a mouse, keyboard, controller, clicker, buttons, touch screen, or other known user interface for facilitating user interaction with electronic devices and smart devices.

While communications have been described above as between student device 220 and server 260, or as between assessment device 240 and server 260, a person of ordinary skill in the art will appreciate that communications may go both to and from server 260. Further, communications (e.g., student and teacher messages) may be passed between student device 220 and assessment device 240.

Figure 3:
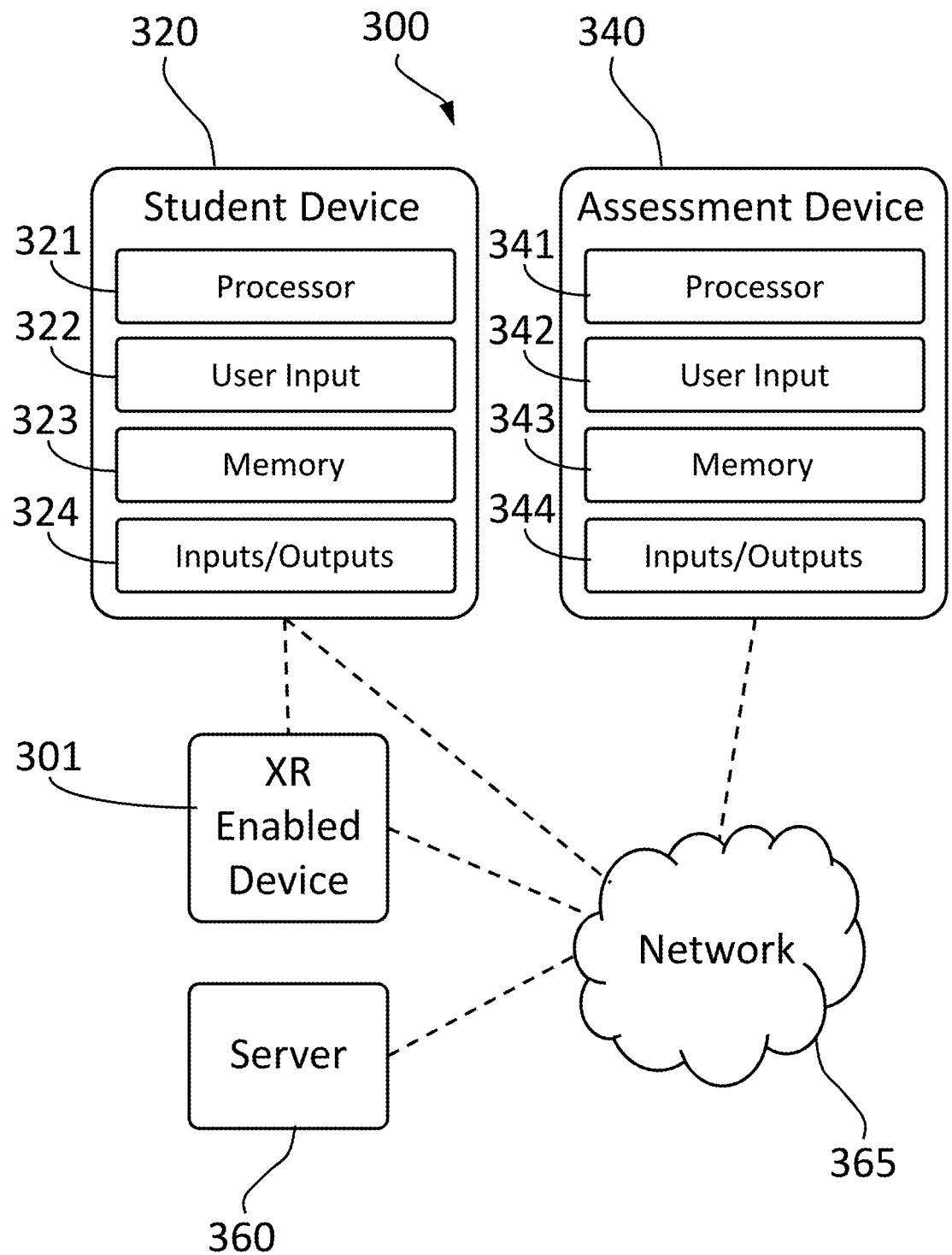
FIG. 3 illustrates a system diagram of an extended reality education system.

FIG. 3 illustrates a system diagram of an extended reality education system 300 having the hardware necessary to achieve integrated learning (e.g., to implement extended reality education system 100 of FIG. 1). Extended reality education system 300 may include a student device 320, an assessment device 340, an external XR enabled device 301, and a server 360. Student device 320, assessment device 340, XR enabled device 301, and server 360 may communicate with each other through a network 365. Network 365 may be a wired and/or wireless network.

Student device 320 may be any electronic device or smart device capable of integrating with the extended reality education system 300. Student device 320 may have a processor 321, a user input 322, a memory 323, and inputs and/or outputs 324. Further, assessment device 340 may have a processor 341, a user input 342, a memory 343, and inputs and/or outputs 344. While not illustrated, it is understood that XR enable device 301 and server 360 may be equipped with one or more of a processor, a user input, a memory, and inputs and/or outputs to facilitate communication and operability within the extended reality education system 300.

Server 360 may include a memory which contains software (e.g., programs and other operating information) forming the basis of the extended reality education system 300. Software may define the qualities, characteristics, and appearance of an extended reality environment, a digital science journal, and an educator dashboard. Further, software may define the features and functions thereof, such as how communication is passed between components of the system (e.g., API calls over network 265), when communications are passed, and/or the frequency thereof.

Student device 320 may be utilized by a user (e.g., a researcher) to access the user's digital science journal (e.g., digital science journal 130 of FIG. 1). Inputs and outputs 324 of student device 320 and of server 360 may facilitate communication via network 365. Processor 321 may process, compute, or otherwise analyze communications from server 360. Memory 323 may store some or all of the communications from server 360, and further may store some or all of software from server 360 (e.g., enough programs or other operating information to facilitate the user's interactions with the digital science journal). User input 322 may enable the user to interact with the digital science journal. User inputs 322 may include one or more of a mouse, keyboard, controller, clicker, buttons, touch screen, or other known user interface for facilitating user interaction with electronic devices and smart devices.

XR enabled device 301 may be utilized by a user to access an extended reality environment (e.g., associated with the user's digital science journal). Inputs and outputs 324 of student device 320, of server 360, and of XR enable device 301 may facilitate communication via a wired or wireless connection (e.g., a local area network) and/or via network 365. Processor 321 may process, compute, or otherwise analyze communications from XR enabled device 301, and a processor of XR enabled device 301 may process, compute, or otherwise analyze communications from student device 320 and/or server 360. Memory 323 may store some or all of the communications from XR enabled device 301, and a memory of XR enabled device 301 may store some or all of the communications from student device 320 and/or server 360. User inputs of the XR enabled device 301 may enable the user to interact with the digital science journal, with server 360, and/or with assessment device 340. The extended reality education system 300 may track the viewpoint of the user within the extended reality environment (e.g., student device 320, server 360, and/or assessment device 340 may receive communications from the XR enabled device 301 to indicate the user's viewpoint, position, orientation, or other interactions within the extended reality environment).

The user inputs of XR enabled device 301 may enable a user to perform navigation and interact within the extended reality environment (e.g., by interacting with visual indicators, points of interest, or other virtual assets which prompt the user to interact with the virtual assets). The user inputs of XR enabled device 301 may include one or more of a mouse, keyboard, controller, clicker, buttons, touch screen, or other known user interface for facilitating user interaction with electronic devices and smart devices.

Thus, a user may access the digital science journal on the student device 320, and when prompted by the digital science journal may access an extended reality environment on the XR enabled device 301 (e.g., such as where an extended reality headset, console, and controllers form the XR Enabled Device 301, and a desktop computer is student device 320). Thus, the extended reality environment may be created using the internal processor and memory of XR enabled device 301, and may be viewable by the user by means of a headset of the XR enable device 301, and where the user may interact with the extended reality environment by means of user inputs of XR enabled device 301.

Assessment device 340 may be utilized by a user (e.g., an educator) to access the user's educator dashboard (e.g., educator dashboard 150 of FIG. 1). Inputs and outputs 344 of assessment device 340 and of server 360 may facilitate communication via network 365. Processor 341 may process, compute, or otherwise analyze communications from server 360. Memory 343 may store some or all of the communications from server 360, and further may store some or all of software from server 360 (e.g., enough programs or other operating information to facilitate the user's interactions with the educator dashboard). User input 342 may enable the user to interact with the educator dashboard. User inputs 342 may include one or more of a mouse, keyboard, controller, clicker, buttons, touch screen, or other known user interface for facilitating user interaction with electronic devices and smart devices.

While communications have been described above as between student device 320 and server 360, or as between assessment device 340 and server 360, a person of ordinary skill in the art will appreciate that communications may go both to and from server 360. Further, communications (e.g., student and teacher messages) may be passed between student device 320 and assessment device 340, and communications (e.g., related to the extended reality environment) may be passed between student device 320 and XR enabled device 301, or between assessment device 340 and XR enabled device 301, or between server 360 and XR enabled device 301.

This technology links an XR (e.g., via the extended reality environment of XR enabled device 301) and web-based learning environment (e.g., via the digital science journal of student device 320) to an assessment dashboard (e.g., via the educator dashboard of assessment device 340) that updates in real time.

The software of server 360 is a hybrid/XR digital experience used with students (e.g., in grades 3-5) to foster scientific thinking (e.g., about water stewardship). Shown are the three integrated components of the software (e.g., the extended reality environment, the digital science journal, and the educator dashboard) that update every 1 second based upon XR interactions and inputs to the digital science journal. These results are fed to the assessment/educator dashboard to guide educator instruction and comments from the assessment dashboard will show up in the digital science journal.

The term 'Extended Reality' (XR) as used here is defined as a computer-simulated environment that can simulate physical presence in places in the real world or imagined worlds. Data flows from the XR experience to both the student's digital science journal and to the teacher/educator dashboard in real time. The student's digital science journal also sends data which flows to both the XR experience and to the teacher/educator dashboard as well. The Educator Dashboard sends data back to the digital science journal when teachers comment or respond to questions from students in the digital science journal.

Figure 4:
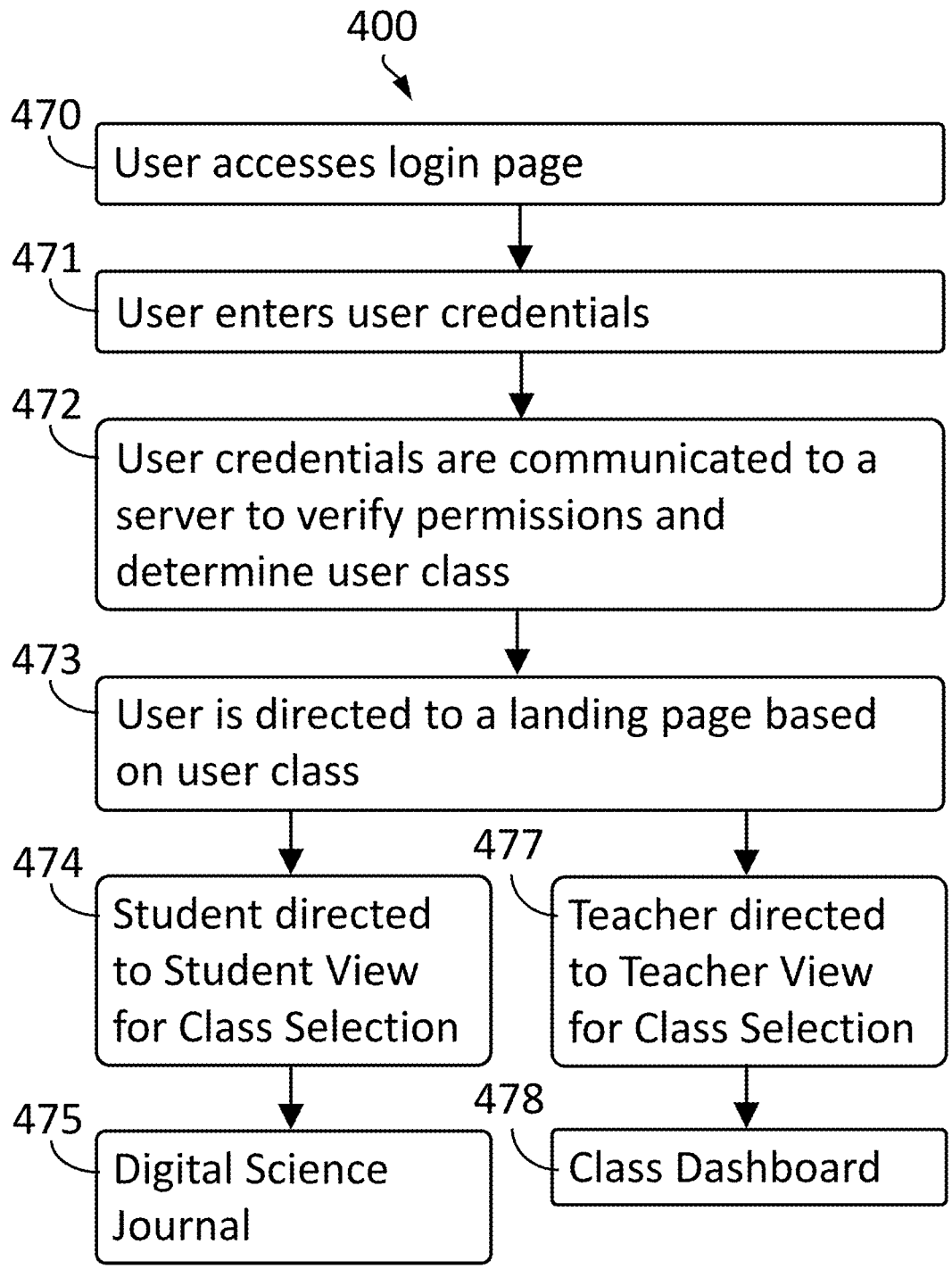
FIG. 4 illustrates a flow diagram for gaining access to an extended reality education system.

FIG. 4 illustrates a flow diagram showing a method 400 for gaining access to an extended reality education system. While FIGS. 1-3 illustrate an extended reality education system having a single extended reality environment/XR enabled device, a single student device/digital science journal, and/or a single assessment device/educator dashboard, this disclosure contemplates a much larger system. As indicated above, the extended reality education system may be operated by students and teachers (e.g., in an educational environment, as part of a school curriculum, and/or as part of an after-school program). Therefore, extended reality education system may be scaled to accommodate one or more students, one or more teachers, one or more classes, one or more subjects and so forth (e.g., between 1 and 30 teachers having between 1 and 5 classes, each class having between 1 and 30 students). Therefore, it may be useful to be able to manage access and permissions to the extended reality education system.

A user may implement the method 400 for gaining access to an extended reality education system on any electronic or smart device (e.g., on student device 220 of FIG. 2 and/or on an assessment device 240 of FIG. 2). Method 400 may include step 470, wherein a user may access a login page. The login page may be accessed via a web-based portal, or may be displayed after initiating a software application. The login page may include one or more fields intended for user credentials which associate the user to the user's account. The login page may also include a feature that allows a user to set up a new account.

At step 471, the user may enter the user's credentials.

At step 472, the user credentials may be communicated to a server to verify permissions and determine user class. User credentials may be communicated upon submission thereof by the user. The server may be a remote server (e.g., server 260 of FIG. 2). Credentials communicated to the server from the login page may be compared against credentials retained on the server. If credentials don't match, the user may be notified and may not be allowed to gain access to the user's account. If the credentials match, the user's class may be identified, and the user may be permitted to log in to the user's account.

At step 473, the user may be directed to a landing page based on the user's class (e.g., students may be routed to a student portal, and teachers may be routed to a teacher portal). The landing page for each user may be personalized in that it may show a number of options which can be selected by the user, and where the options may be unique to that user.

At step 474, the user (e.g., a student) may be directed to a student view for class selection. The user may be presented with the option to select one of a number of classes to which the student has been enrolled.

At step 475, the user may be directed to the digital science journal associated with their account based on the class selection. Each user may have a digital science journal for each class indicated on the class selection page, or each user may have a single digital science journal with chapters, or modules, for each class on the class selection page (e.g., with the option selected routing the user to the appropriate chapter within the digital science journal).

At step 477, the user (e.g., a teacher) may be directed to a teacher view for class selection. The user may be presented with the option to select one of a number of classes to which the teacher has been designated to teach.

At step 478, the user may be directed to the class dashboard for the class selected on the class selection page.

Figure 5:
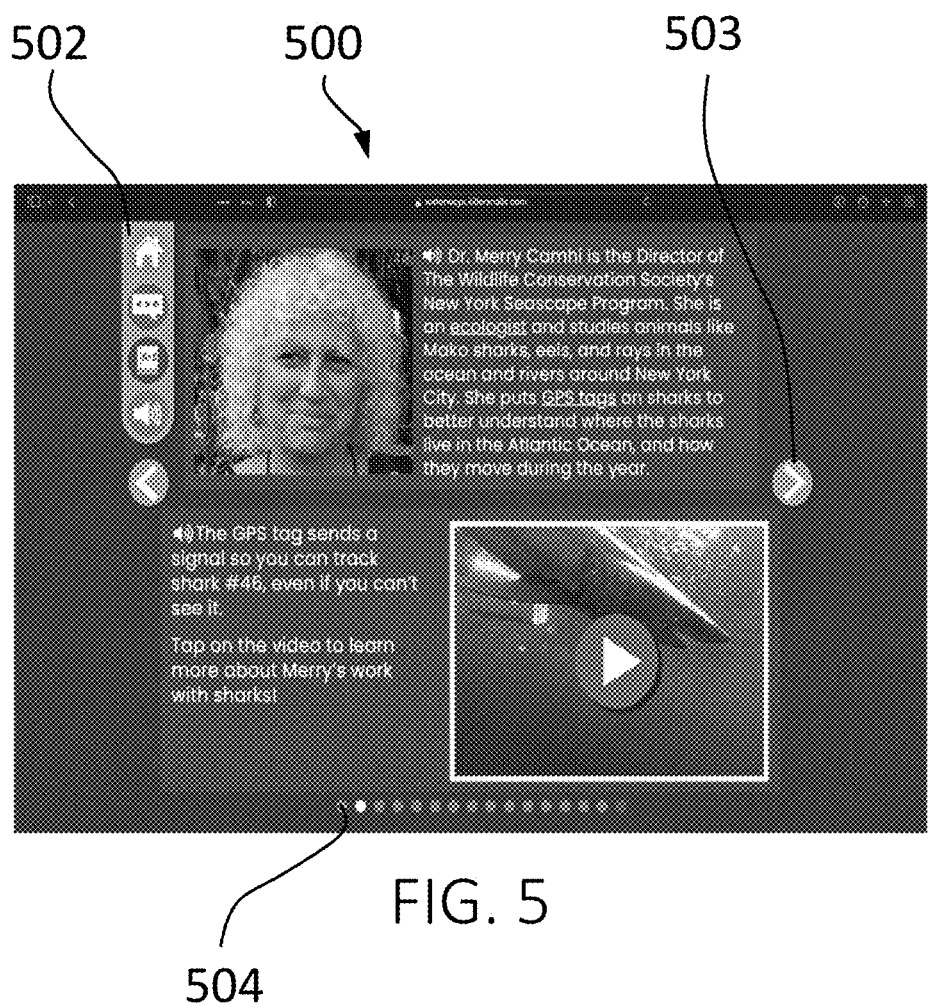
FIG. 5 illustrates a screenshot of an extended reality education system.

FIG. 5 illustrates a screenshot 500 taken from an extended reality education system. The screenshot 500 illustrates a single page taken from an educational module of the digital science journal. Pages may contain educational captions, photographs, images, graphics, maps, video clips, audio clips, or other educational material for the student to interact with. Students may be able to navigate from one page to the next within the digital student journal by interacting with the forward and/or backward arrows 503. The page number of total number of pages 504 for each educational module may be indicated at the bottom of the page.

A toolbar 502 may provide the student with additional features, represented by icons. A first icon (e.g., a home icon), when interacted with, may return a student to the home screen (e.g., the student view of the landing page). A second icon (e.g., a speech bubble), when interacted with, may enable a student to send messages to the appropriate teacher for the class or module, and may enable the student to receive messages from the appropriate teacher. A third icon (e.g., an open book), when interacted with, may direct a student to a vocabulary page for terms used on a particular page or within a particular educational module. A fourth icon (e.g., an airwave icon), when interacted with, may toggle between a muted condition and an audio feature that reads aloud the text on a particular page of the educational module. The volume and accent of the voice that reads aloud the text may be configurable. A fifth icon (e.g., a "P" icon), when interacted with, may direct a student to a poster page associated with the educational module. The student may be able to drag and drop content from the educational module into the poster page. The student may be able to select content from the educational module from a list, such that the selected content may be displayed on the poster page (e.g., poster page exemplified by screenshot 4000 of FIG. 40).

A student's interactions with each page and the time the student spends on each page may be communicated from the digital science journal to a server (e.g., server 360 of FIG. 3) and/or to the educator dashboard.

Figure 6:
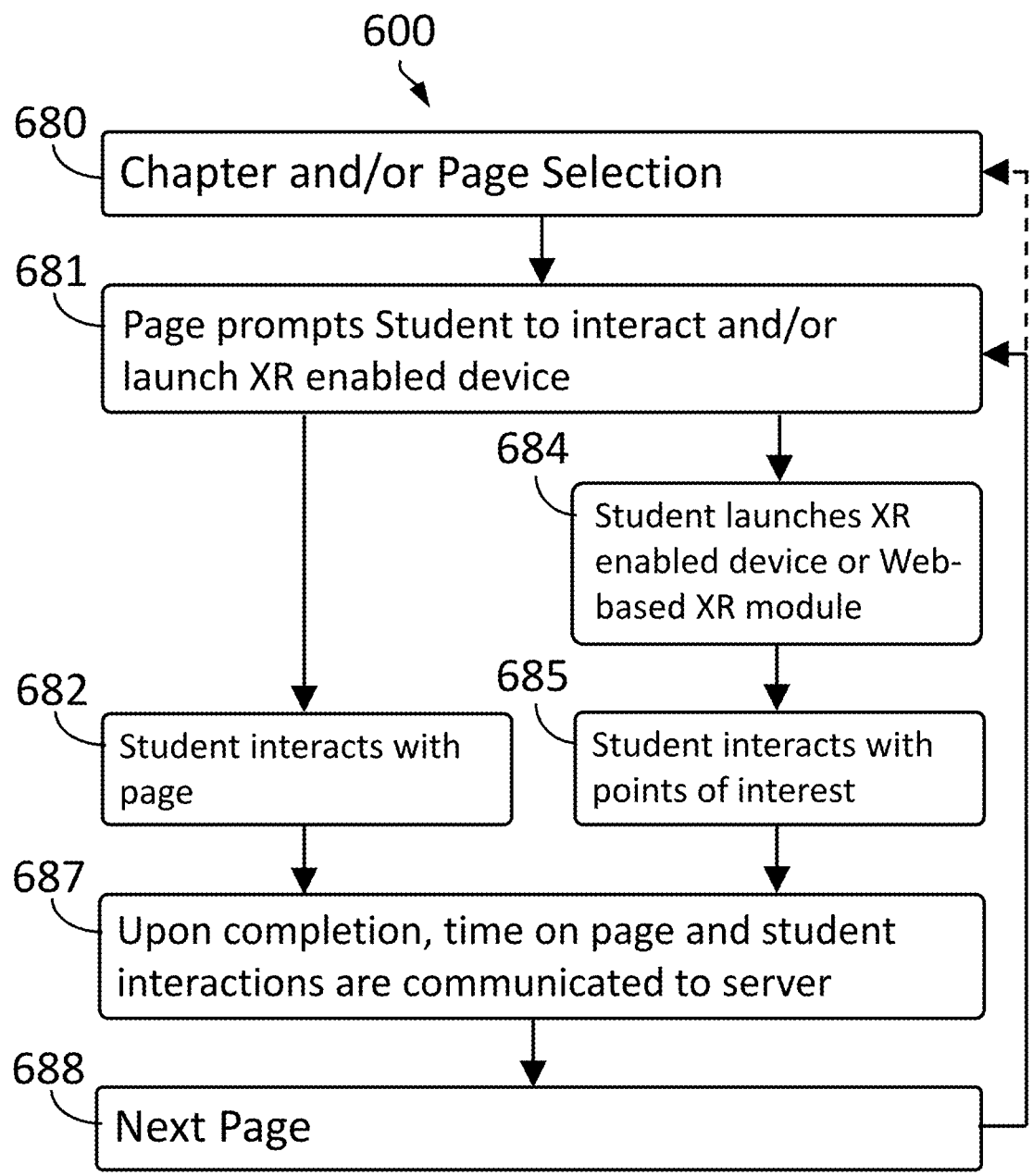
FIG. 6 illustrates a flow diagram for navigating through an extended reality education system.

FIG. 6 illustrates a flow diagram for a method 600 of navigating through an extended reality education system, such as navigating through a digital science journal. More particularly, a student may obtain access to the extended reality education system as indicated in FIG. 4 to arrive at the student view of the landing page.

At step 680, the student may make a chapter and/or page selection to navigate to the desired chapter and/or to the desired page of an educational module. Students may only navigate to chapters which are unlocked sequentially (e.g., based on the student's activity in the module and/or where permission has been granted by an educator).

At step 681, the student may begin to investigate the selected page. The student may be prompted to interact with the selected page and further may be prompted to utilize an XR enabled device (e.g., XR enabled device 201 of FIG. 2) to launch an extended reality environment. Each module may have one or more opportunities to launch an extended reality environment, though not every page may provide this feature. However, each page may require interaction from the student.

At step 682, the student may interact with content of the selected page of the digital science journal (e.g., with video, audio, to answer questions, to progress to the next page, and so forth). Interactions and time on each page may be tracked and recorded and communicated throughout the extended reality education system as described in this disclosure (e.g., communicated to a server).

At step 684, the student may utilize an XR enabled device (e.g., XR enabled device 301 of FIG. 3) to launch an extended reality environment. Where an XR enabled device is not available, the student may have the option to launch a web-based XR module.

At step 685, the student may interact with points of interest within the extended reality environment. Interactions may be tracked and recorded and communicated throughout the extended reality education system as described in this disclosure (e.g., communicated to an educator dashboard).

At step 687, the student completes either the selected page of the digital science journal, extended reality environment module, and/or the web-based XR module. Upon successful completion, the time spent may be communicated throughout the extended reality education system as described in this disclosure (e.g., communicated to an educator dashboard).

At step 688, the student proceeds to the next page and the cycle is repeated until the student either completes every page of the educational module, or opts to navigate back to the home screen of the digital science journal.

Figure 7:
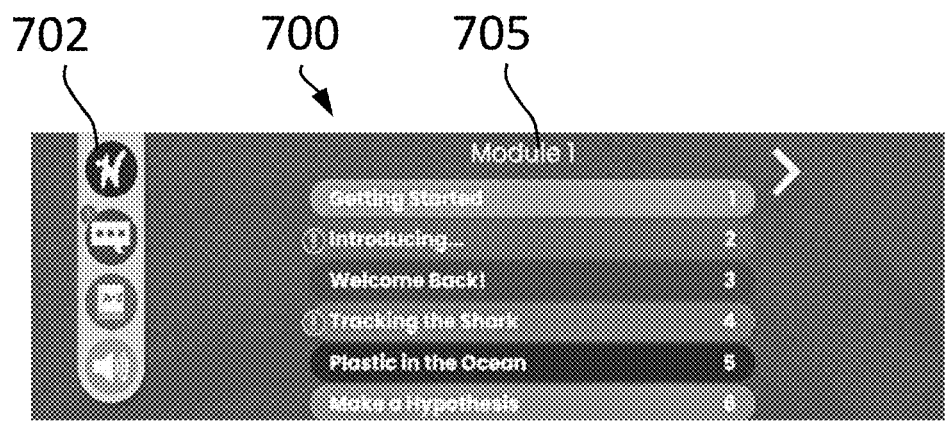
FIG. 7 illustrates a screenshot of an extended reality education system.

FIG. 7 illustrates a screenshot 700 taken from an extended reality education system. The screenshot 700 illustrates a toolbar 702 and a table of contents 705 for a selected educational module. The toolbar 702 may provide the student with additional features as described in this disclosure. The landing page may provide links with captions to each page of the educational module.

Figure 8:
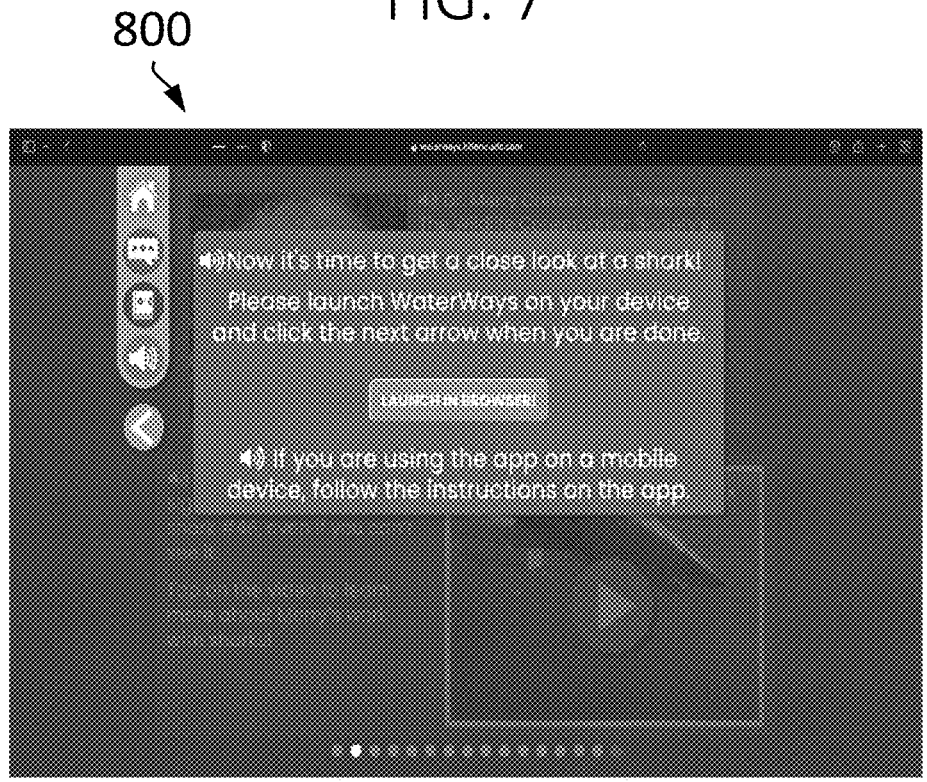
FIG. 8 illustrates a screenshot of an extended reality education system.

FIG. 8 illustrates a screenshot 800 taken from an extended reality education system. The screenshot 800 illustrates a prompt for the student to utilize an XR enabled device (e.g., XR enabled device 201 of FIG. 2) to launch an extended reality environment. Where an XR enabled device is not available, the student may have the option to launch a web-based XR module (e.g., via linked text "LAUNCH IN BROWSER").

Figure 9:
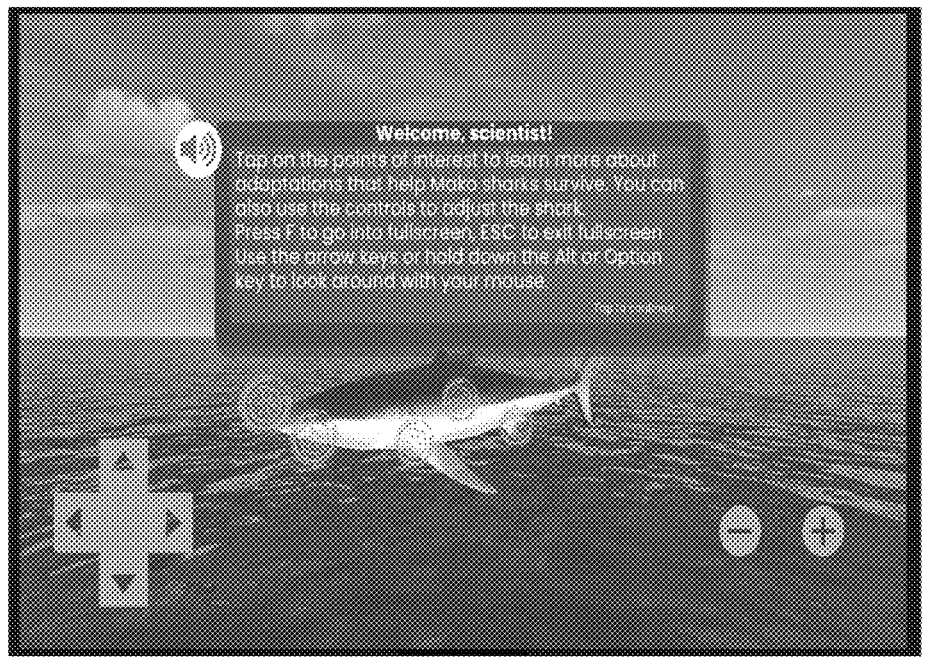
FIG. 9 illustrates a screenshot of an extended reality education system.

FIG. 9 illustrates a screenshot 900 taken from an extended reality education system. The screenshot 900 illustrates a two-dimensional representation of what the student would see in the extended reality environment (e.g., a three-dimensional shark and a body of water). Students may be presented with prompts (e.g., informational captions) to educate the student and/or navigation tools (e.g., movement arrows, zooming, etc.) to help them navigate through the extended reality environment. Further, points of interest may appear throughout the extended reality environment (e.g., demarcated circles on the shark) for the students to interact with.

An orange circle indicates points of interest, arrow buttons allow for moving the shark up, down, left or right, minus and plus buttons enable the player to increase or decrease the size of the virtual shark. Then, responsive to the user clicking on the device, information or questions about the shark appears in the player's view. Students may interact with the prompts, navigation tools, and/or points of interest, and such interactions may be communicated throughout the extended reality education system as described in this disclosure (e.g., communicated to an educator dashboard via a server).

Figure 10:
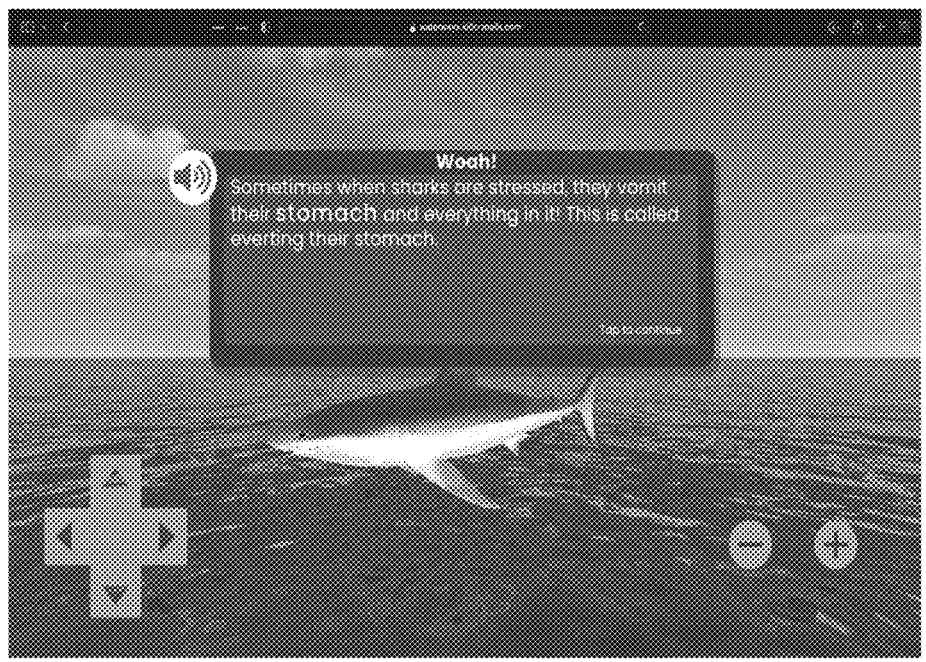
FIG. 10 illustrates a screenshot of an extended reality education system.
Figure 11:
FIG. 11 illustrates a screenshot of an extended reality education system.
Figure 12:
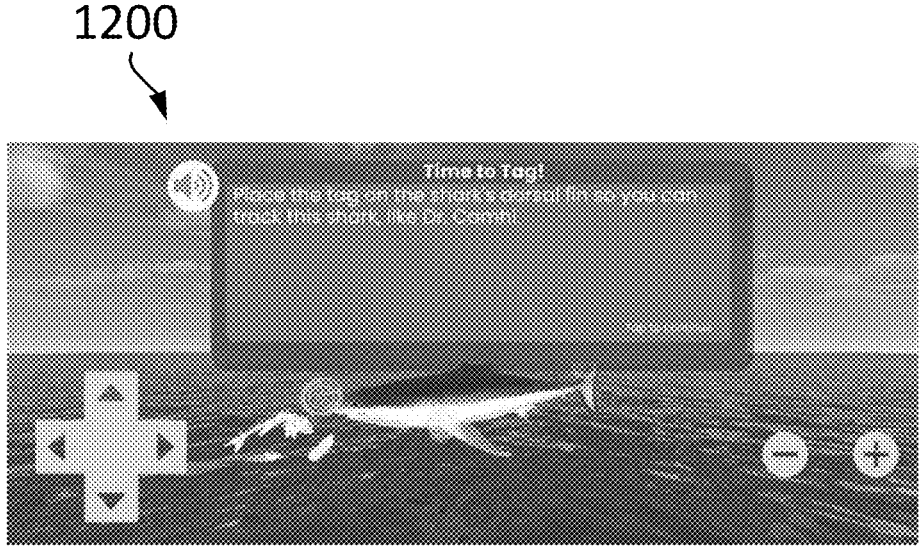
FIG. 12 illustrates a screenshot of an extended reality education system.
Figure 13:
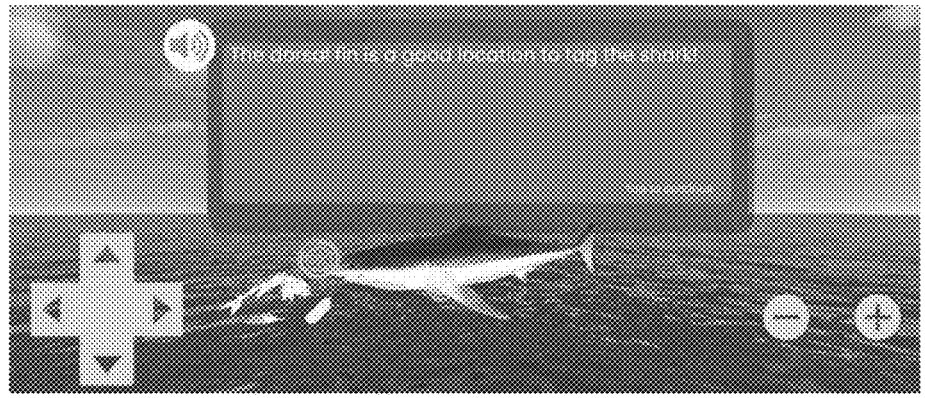
FIG. 13 illustrates a screenshot of an extended reality education system.
Figure 14:
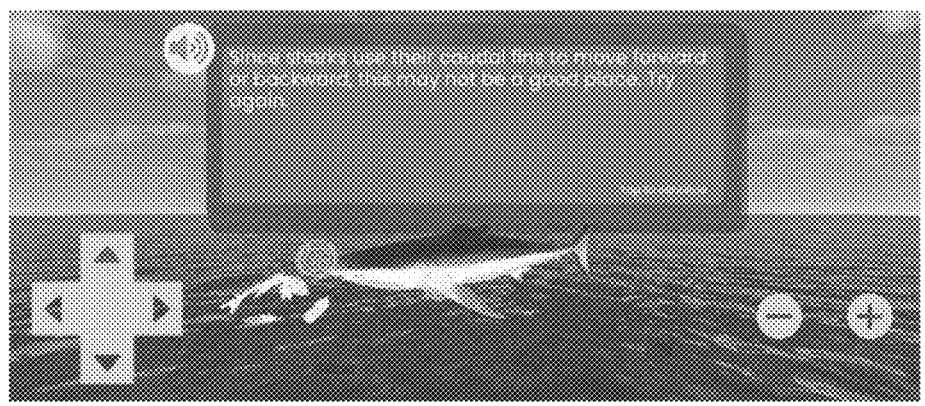
FIG. 14 illustrates a screenshot of an extended reality education system.

FIG. 10 illustrates a screenshot 1000 taken from an extended reality education system. The screenshot 1000 illustrates a two-dimensional representation of what the student would see in the extended reality environment (e.g., a three-dimensional shark and a body of water). A series of prompts may provide additional educational material to the student as the student interacts within the extended reality environment. In addition to informational captions being provided in the prompts, audio may be provided which recites the textual wording of the captions, such that students may be able to both hear and read the captions simultaneously.

FIGS. 11, 12, 13 and 14 illustrate screenshots 1100, 1200, 1300, and 1400 taken from an extended reality education system, showing a progression of the extended reality environment as the student interacts with points of interest in the environment. As the student continues to interact with the points of interest, prompts, and navigational tools, new points of interest may appear to enable the student to continue to learn and progress through the educational module. Immediate feedback may be provided to users. In this system, when students answer incorrectly, they may not progress until they reach the correct answer. Students interact in extended reality (e.g., virtual and/or augmented reality) then data is pulled into the digital student journal for students to reflect.

Figure 15:
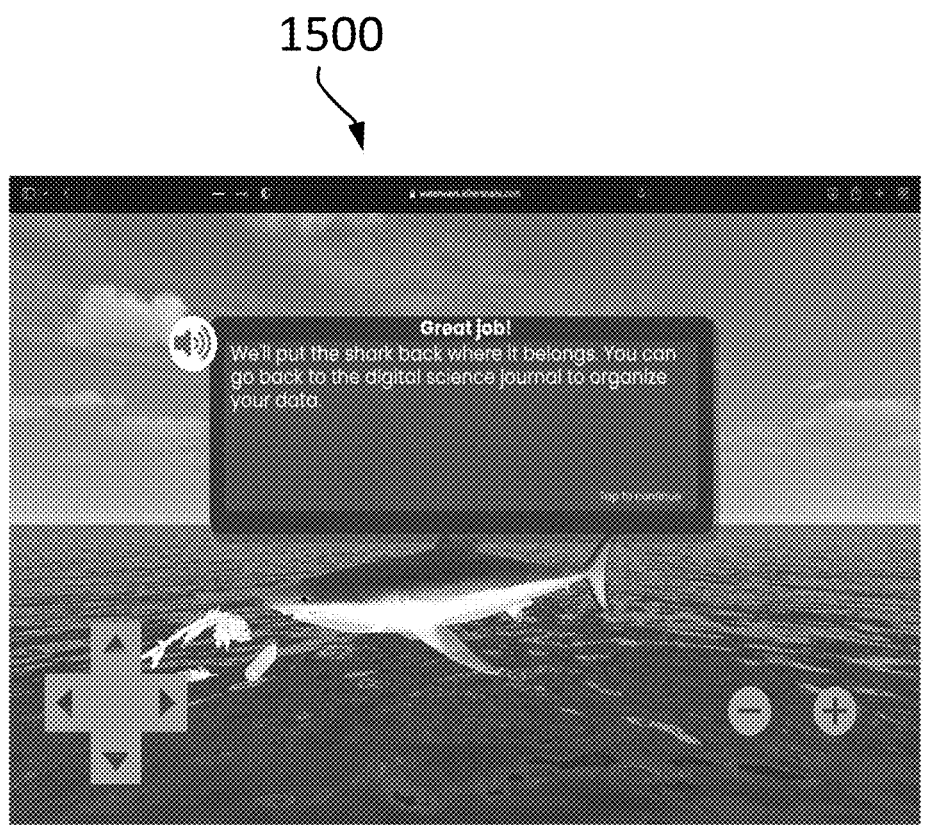
FIG. 15 illustrates a screenshot of an extended reality education system.
Figure 16:
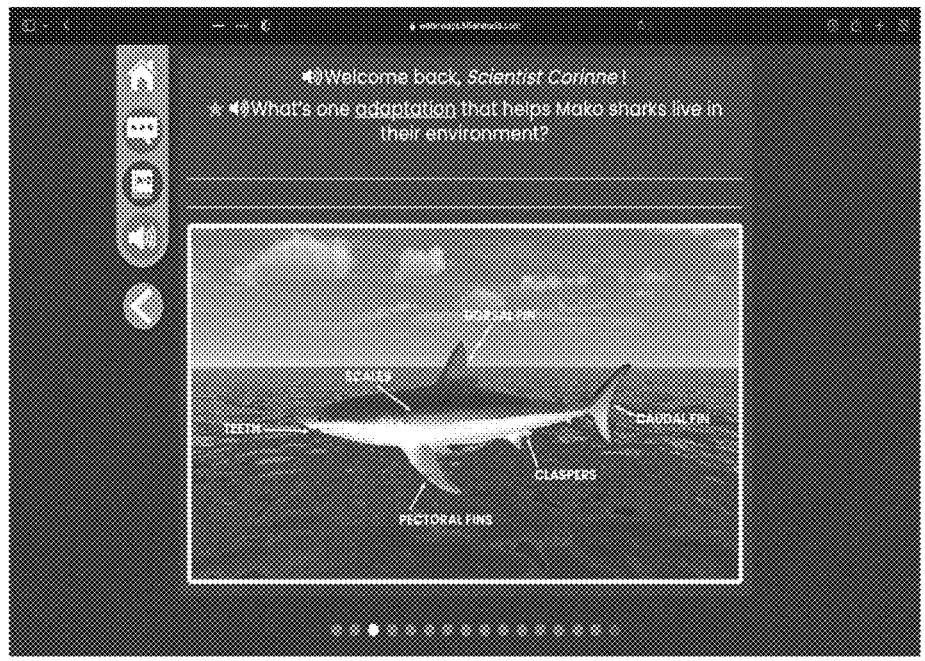
FIG. 16 illustrates a screenshot of an extended reality education system.
Figure 17:
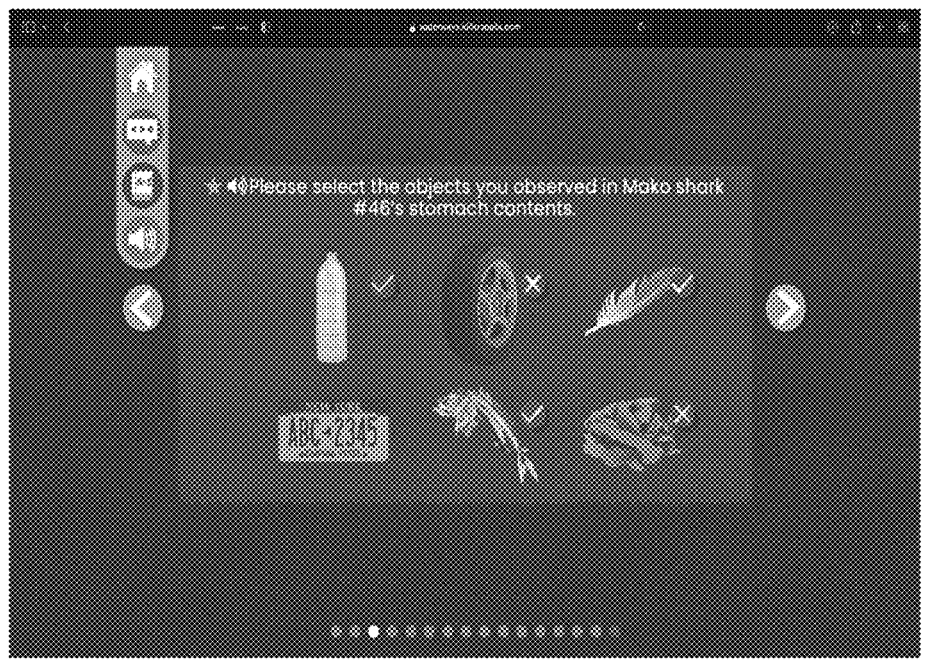
FIG. 17 illustrates a screenshot of an extended reality education system.
Figure 18:
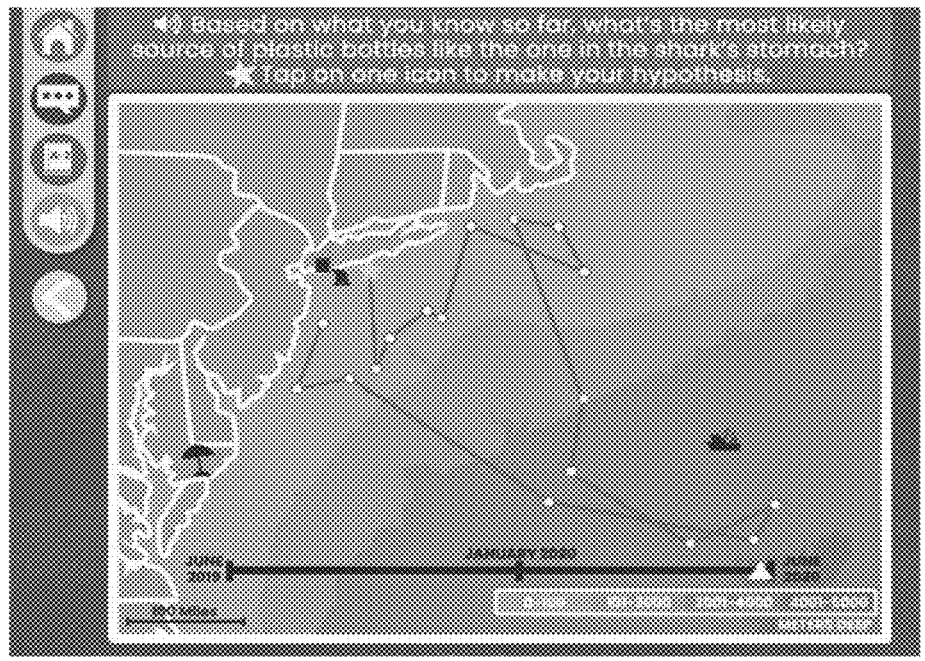
FIG. 18 illustrates a screenshot of an extended reality education system.
Figure 19:
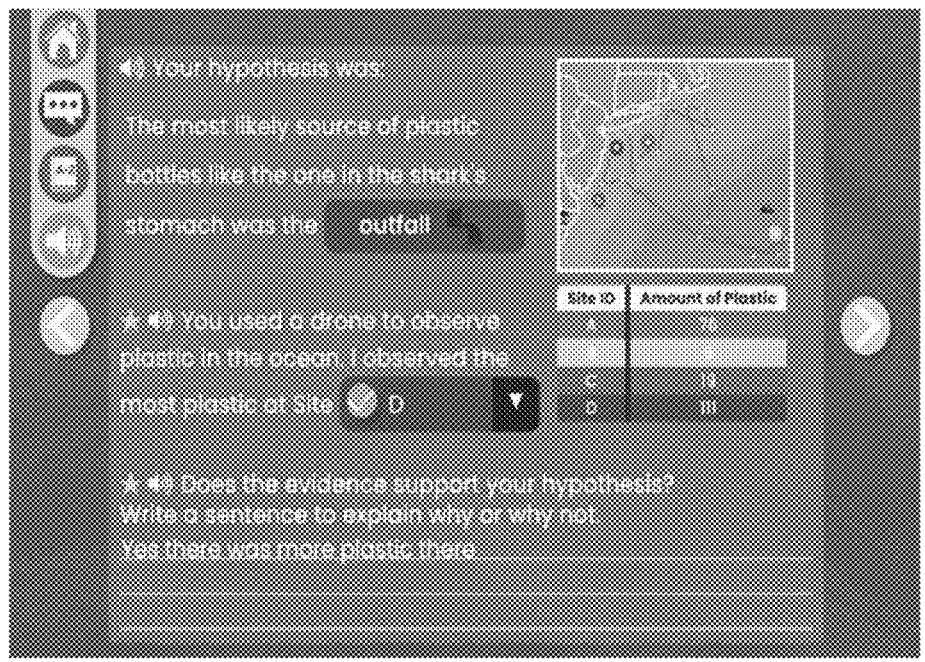
FIG. 19 illustrates a screenshot of an extended reality education system.

FIG. 15 illustrates a screenshot 1500 taken from an extended reality education system showing the completion of the extended reality environment module. Upon completion, the student may receive a prompt to return to the digital science journal on the student device (e.g., student device 220 of FIG. 2). The student's time to complete the extended reality environment module may be tracked, recorded, and communicated throughout the extended reality education system as described in this disclosure (e.g., communicated to an educator dashboard via a student device and a server).

FIGS. 16, 17, 18 and 19 illustrate screenshots 1600, 1700, 1800 and 1900 taken from an extended reality education system showing other aspects of the digital science journal. On the selected pages as represented in FIGS. 16, 17, 18 and 19, the student may be asked one or more questions, and the student may be required to interact with the page to answer the questions (e.g., by clicking on one or more selected options, typing in a written answer, and so forth). The student's answers may be saved, stored, and communicated throughout the extended reality education system as described in this disclosure (e.g., communicated to an educator dashboard via a server). Students write questions, notes, and hypotheses (e.g., answers to questions asked in the educational module) in their own digital journals which may be accessed by any web-enabled device. The digital science journal also provides space to build models (e.g., when prompted in the educational module to interact by drawing a food web, dropping stickers, or dragging images), upload data and apply the scientific method, such as when a previous answer or hypothesis is displayed and compared to a newly learned facts and data.

Figure 20:
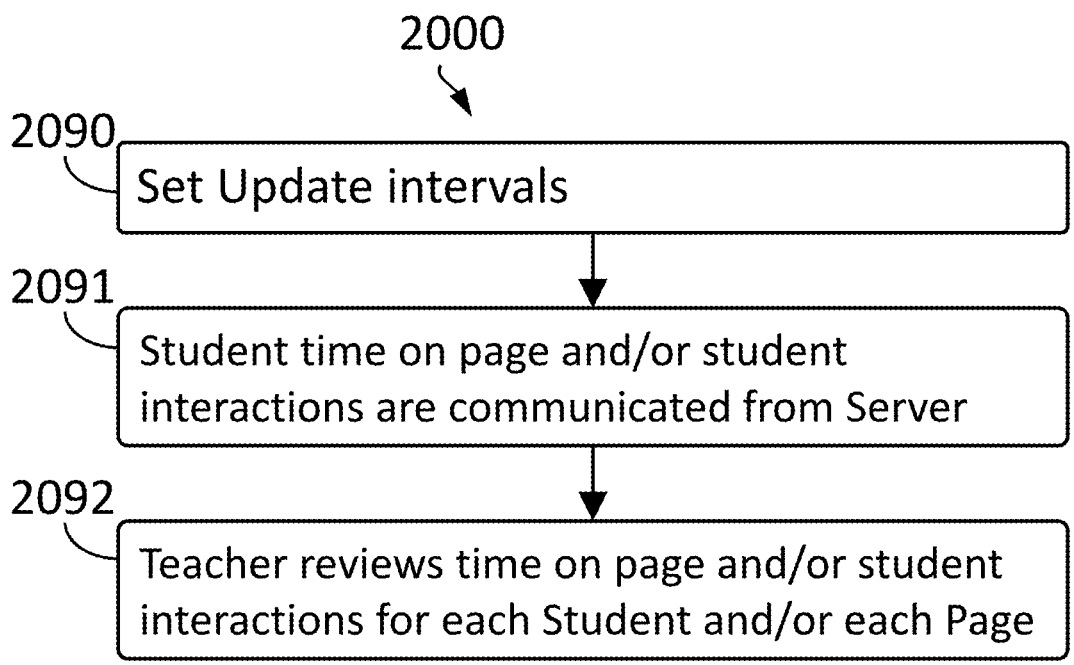
FIG. 20 illustrates a flow diagram for navigating through an extended reality education system.

FIG. 20 illustrates a flow diagram for a method 2000 of navigating through an extended reality education system, such as navigating through an educator dashboard. More particularly, a teacher or educator may obtain access to the extended reality education system as indicated in FIG. 4 to arrive at the teacher view of the landing page.

At step 2090, the teacher may set update intervals for how often the educator dashboard is updated with data on the student interactions from the digital science journal and/or the extended reality environment module.

At step 2091, the educator dashboard may be updated periodically as selected at step 2090 with data on the student interactions and time on page from the digital science journal and/or the extended reality environment module (e.g., as stored and relayed from the server).

At step 2092, the educator or teacher may review data presented in the educator dashboard as updated from the server, including time on page and student interactions. Student interactions may refer to answers to questions presented in the digital science journal, recordation of any points of interest that have been interacted with, and any other interactions described in this disclosure.

Figure 21:
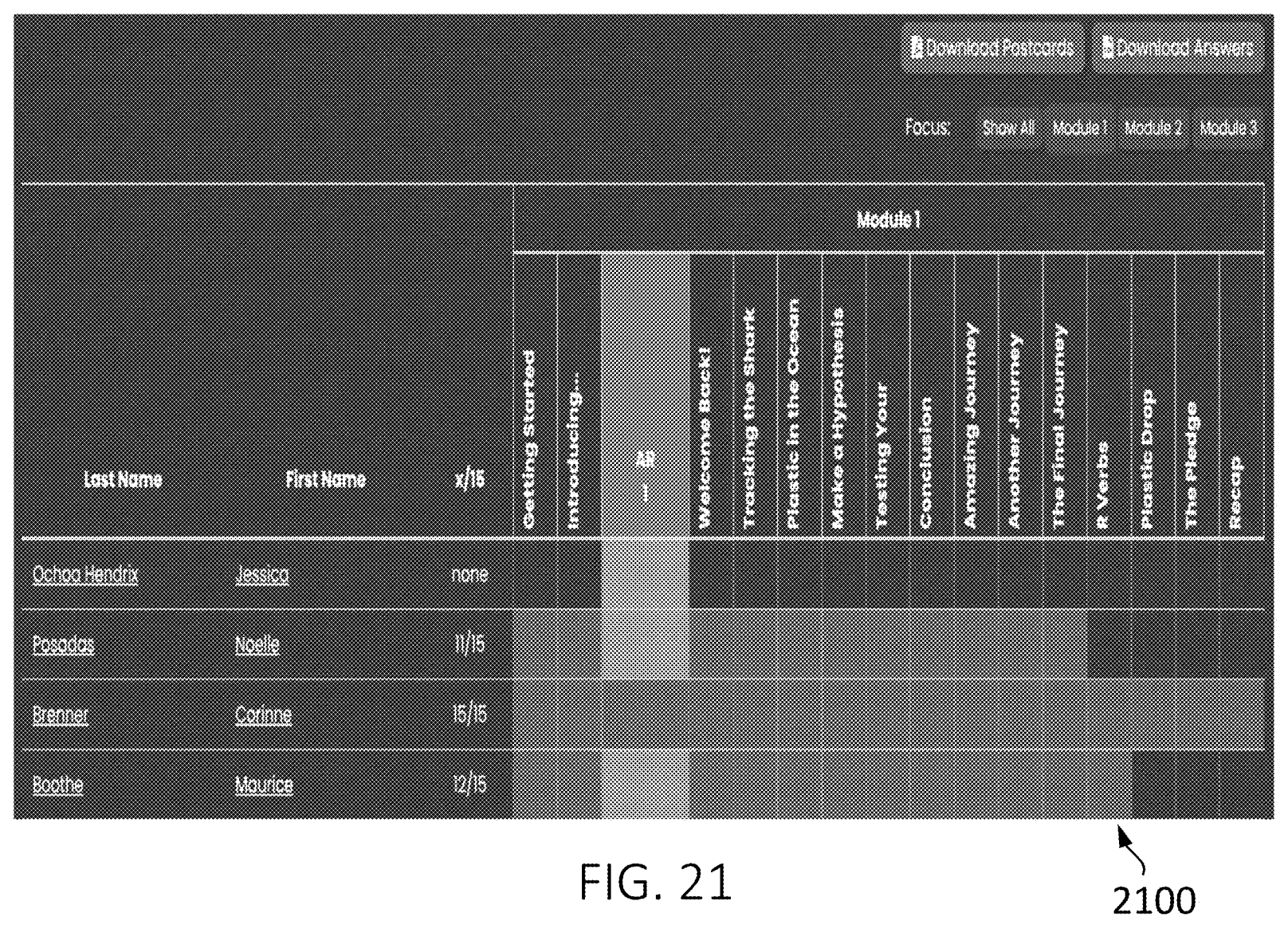
Figure 22:
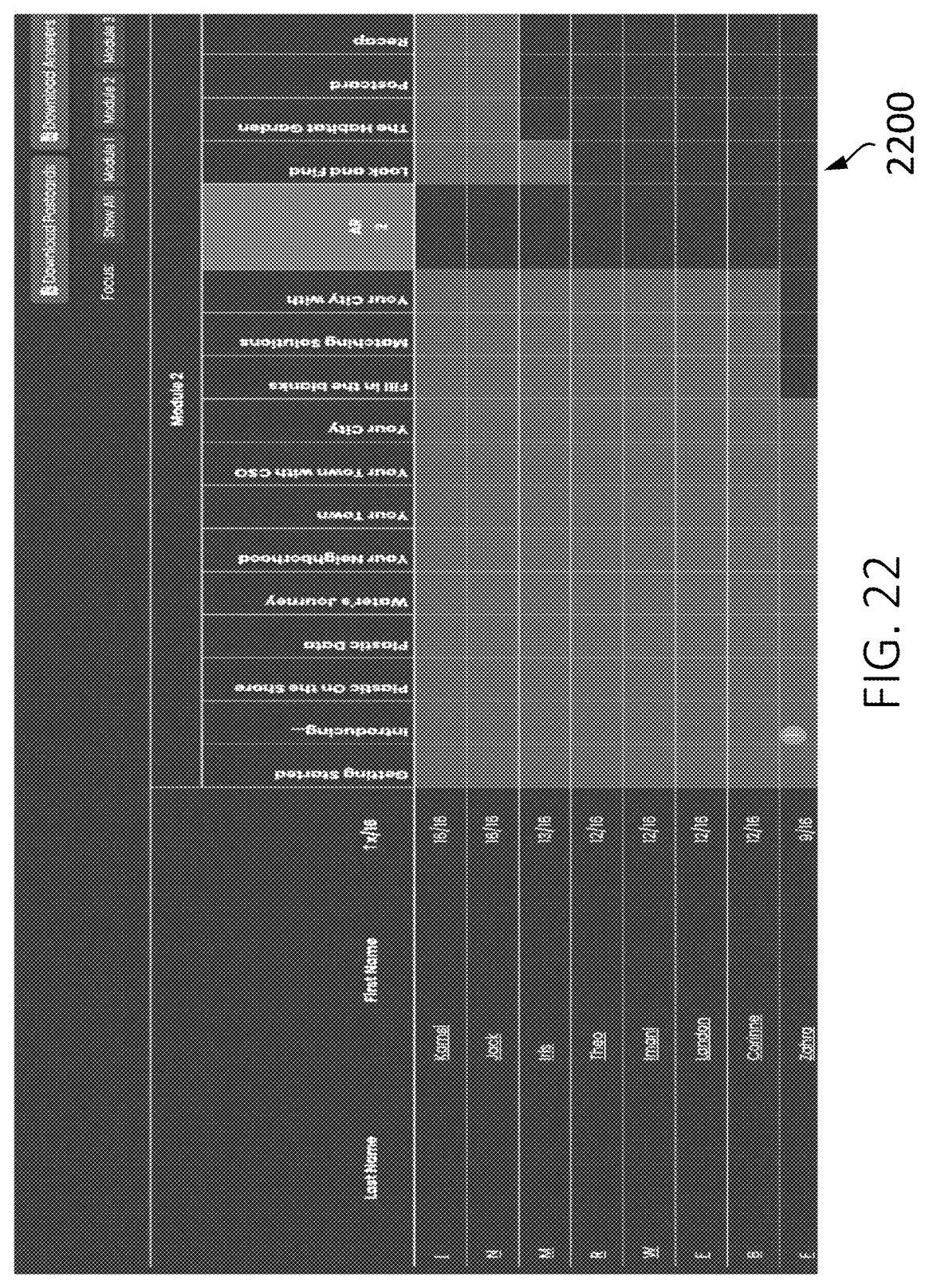
Figure 23:
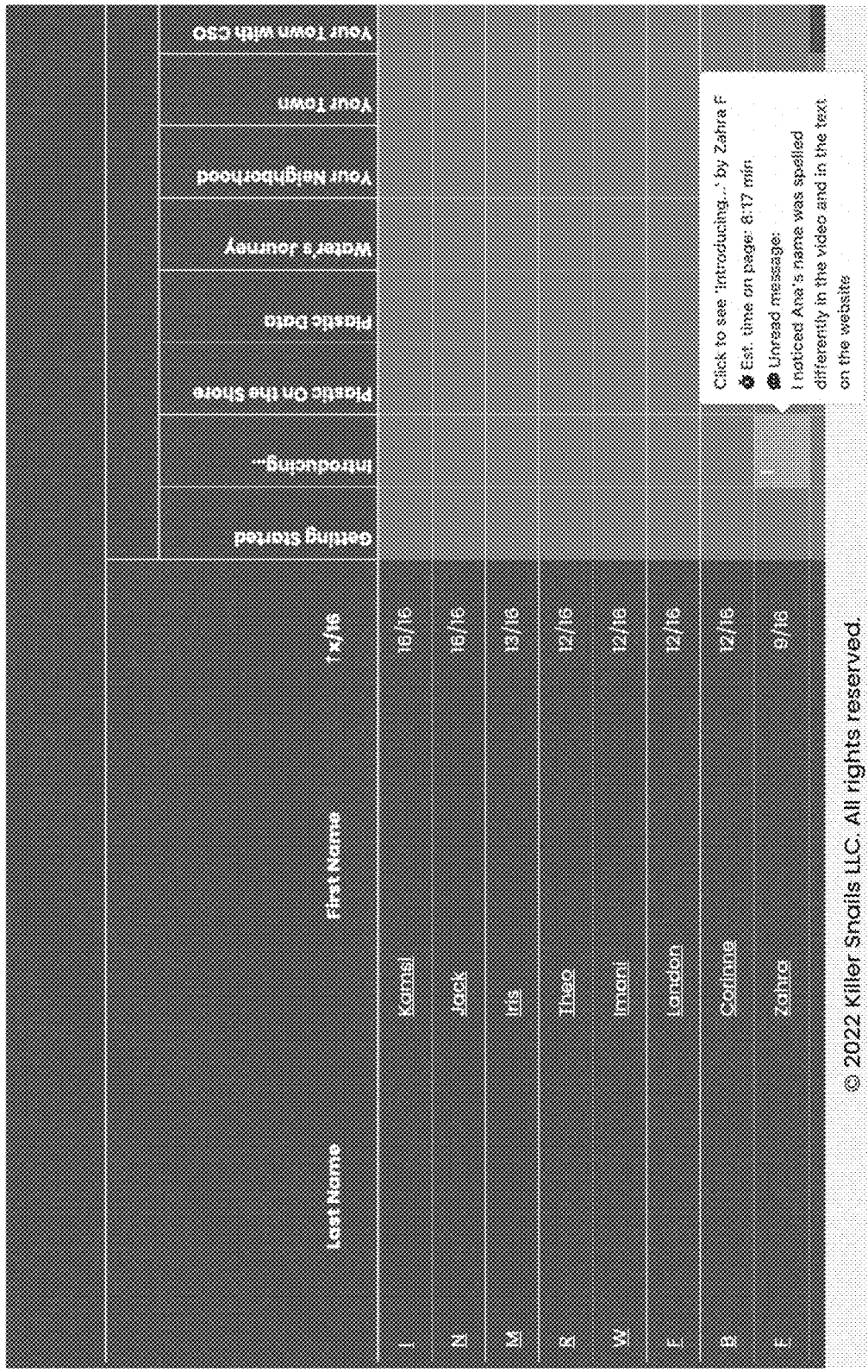
FIG. 23 illustrates a screenshot of an extended reality education system.

FIGS. 21, 22, and 23 illustrate screenshots 2100, 2200, and 2300 taken from an extended reality education system showing aspects of the educator dashboard. For each class, an educator may be presented with a record or tabulation showing the completion or non-completion of each educational module (e.g., including the extended reality modules) by each student in the selected class. Thus, each cell in the tabulation may indicate whether a particular student has completed a particular module and/or a particular page within the module.

As the player selects the shark, the teacher's user interface polls the server, and automatically populates enabling the teacher to see the player's actions and provides the teacher with the time spent in XR, the interactions the user had, and the responses the student gave. Polling may occur in real time (e.g., once every second). Completion may be indicated by highlighting the cell in a color which indicates completion (e.g., green), or by including a symbol which indicates completion (e.g., "C"). Different colors and/or symbols may be used to indicate any number of different statuses (e.g., complete, viewed but not complete, not viewed, or other player actions). The educator dashboard updates showing the classes progress and also showing any comments or questions students have. Where a number is indicated in a cell, the number may indicate that the subject student has a question or unresolved concern with regard to the page/module where the numbered cell appears.

As exemplified in FIG. 23, an educator may, interact with a cell (e.g., by hovering a cursor over any cell) to view a pop-up window (exemplified in the lower-right corner of FIG. 23) which indicates details regarding the indicated page as completed by the subject student. Where the student has posted a question, the educator may also review the question left by the student. The educator may interact with any cell (e.g., by clicking on the cell) such that a submenu or subscreen may be presented that allows the educator to leave a comment, response, or feedback for the subject student. Comments, responses, or feedback left by an educator will be returned to the student (e.g., in their messaging feature). Thus, communications may be sent from the educator dashboard (e.g., from the assessment device 340 of FIG. 3) back to the server (e.g., server 360 of FIG. 3) and/or to any digital science journal (e.g., to student device 320 of FIG. 3).

Figure 24:
FIG. 24 illustrates a screenshot of an extended reality education system.

FIG. 24 illustrates a screenshot 2400 of an extended reality education system showing a subscreen of the educator dashboard. An educator may interact with a cell (e.g., by clicking on a cell) corresponding to a specified student and corresponding to the extended reality environment module such that a submenu or subscreen (e.g., as exemplified in screenshot 2400) may be presented that allows the educator to review the specified student's time on page and/or interactions with various points of interest while in the extended reality environment. In this way, the educator may be able to review the specified student's work and assess the specified student's level of engagement in the educational module. The educator may be able to see whether the specified student interacted with any, some, or all of the points of interest in the extended reality environment. The educator may be able to see how much time was spent on each page. The educator may be able to determine the student's level of engagement (e.g., a short time may indicate the student was clicking through the module with little or no engagement, an excessive time may indicate the student was having trouble, and so forth).

Figure 25:
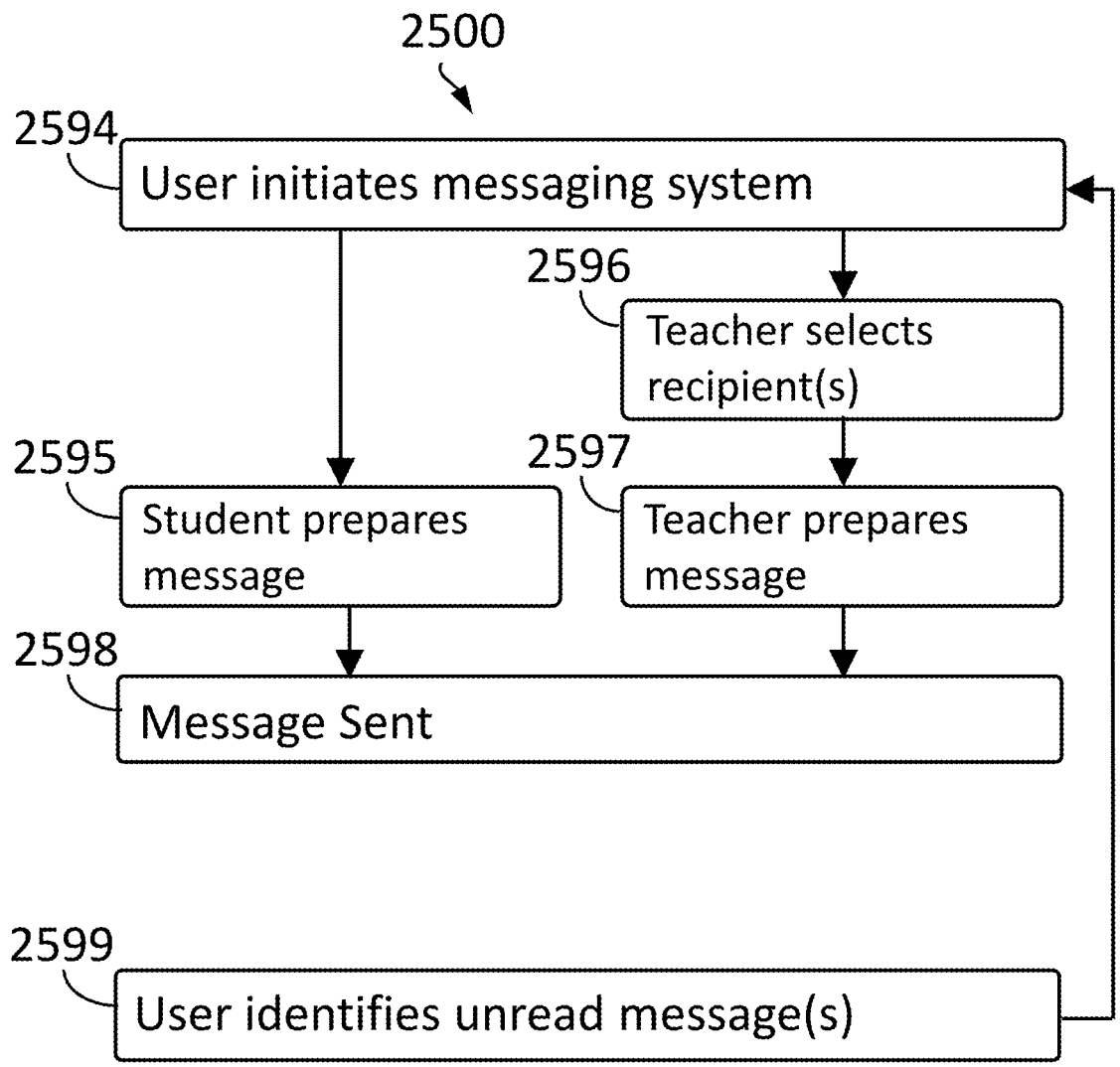
FIG. 25 illustrates a flow diagram for a messaging system within an extended reality education system.

FIG. 25 illustrates a flow diagram for a method 2500 of navigating through an extended reality education system, such as navigating through a messaging system. As indicated in this disclosure with regard to FIGS. 5 and 23, students and teachers may be able to create and communicate with each other within the extended reality education system.

At step 2594, a user (e.g., a student or an educator) initiates the messaging system. A student may initiate the messaging system by interacting with (e.g., clicking on) the second icon of the toolbar 502 of FIG. 5. A student may initiate the messaging system by interacting with a question field on a page within the digital science journal. An educator may initiate the messaging system by interacting with (e.g., clicking on) a cell of the educator dashboard to open a subscreen. An educator may initiate the messaging system by interacting with (e.g., clicking on) the second icon of the toolbar 502 of FIG. 5.

At step 2595, a student prepares a message.

At step 2596, an educator/teacher selects recipients of a message. The educator may be able to send a message to a single student, or may be able to send a message to a group of students (e.g., a selected number of student within a class of students and/or an entire class of students).

At step 2597, an educator/teacher prepares a message.

At step 2598, the prepared message may be sent. Student messages and questions may be communicated to the educator dashboard of their teacher (e.g., to the teacher of the module corresponding to their question). Teacher messages, comments, and feedback may be communicated to the student's digital science journal.

At step 2599, a user may identify unread messages. A student may see a symbol (e.g., a red exclamation mark) located within the digital science journal (e.g., indicated on the third icon of the toolbar of FIG. 27) that indicates an unread message. An educator/teacher may see a number in a cell of the educator dashboard corresponding to a particular student that indicates a message or question related to a corresponding topic or page of the digital science journal. After identification of an unread message or messages, the user may perform one or more of step 2594 through step 2598 to read and respond to the message(s).

Figure 26:
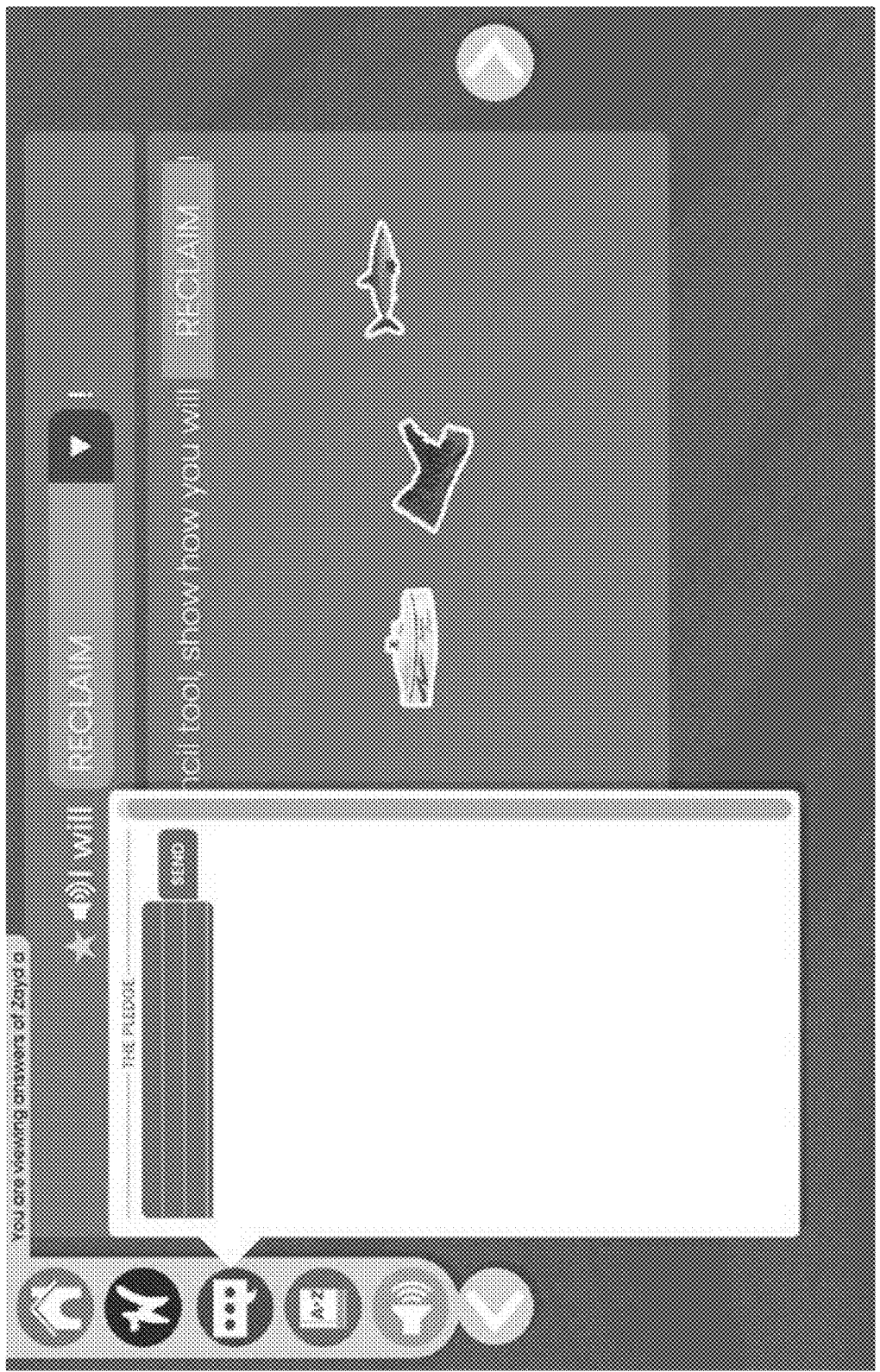
FIG. 26 illustrates a screenshot of an extended reality education system.
Figure 27:
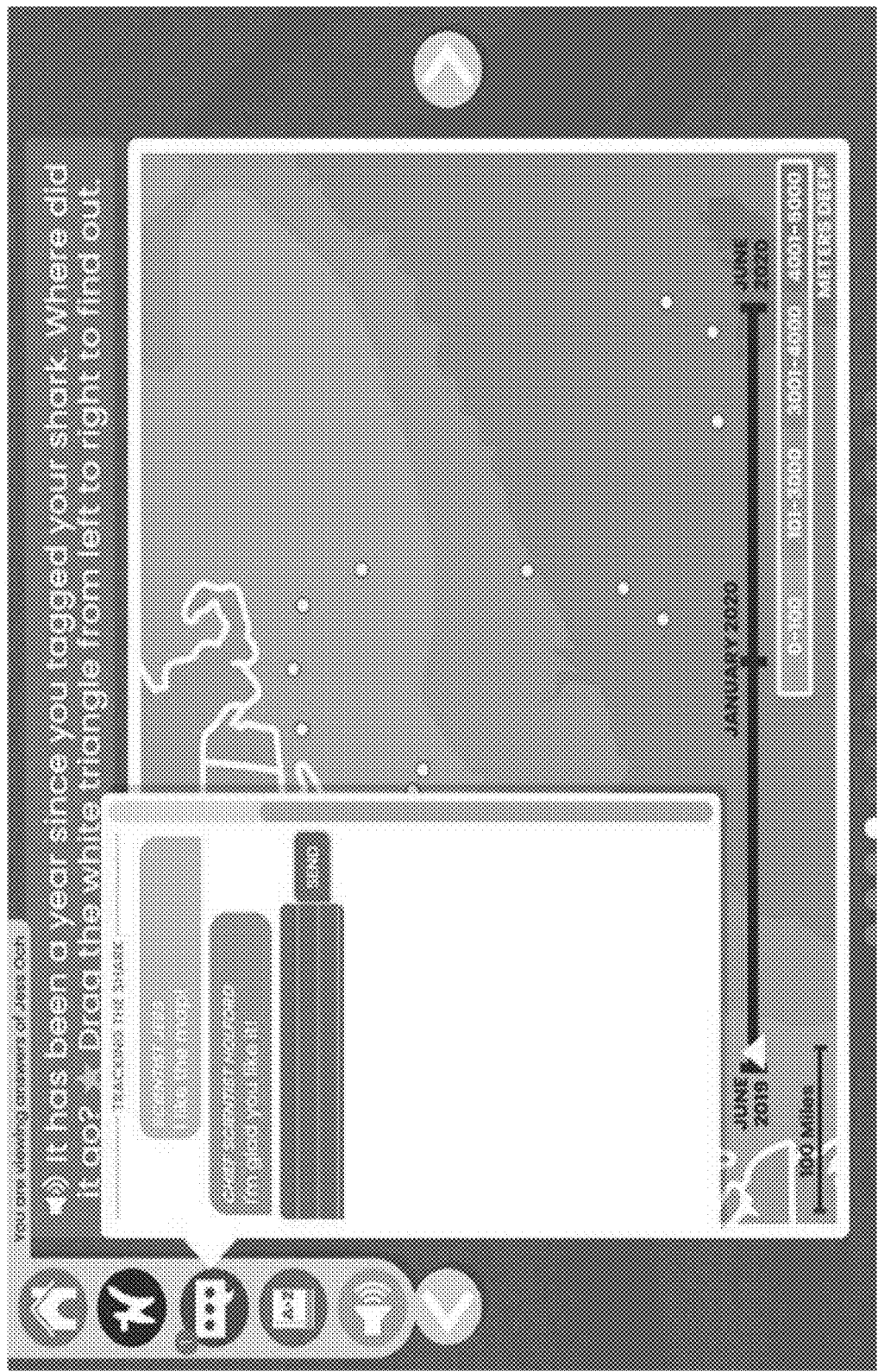
FIG. 27 illustrates a screenshot of an extended reality education system

FIGS. 26 and 27 illustrate screenshots 2600 and 2700 of an extended reality education system showing a messaging system of the extended reality education system. A user (e.g., an educator or a student) may access the messaging system to communicate messages, questions, comments, and feedback to other users. A user may interact with the speech bubble to activate the messaging system. A student may prepare and communicate a message to the educator for the relevant subject-matter. The educator (referred to as Chief Scientist Last Name) may leave a response. As indicated in FIG. 27, the student may see a symbol (e.g., a red exclamation mark) indicating that the educator/teacher has commented.

Figure 28:
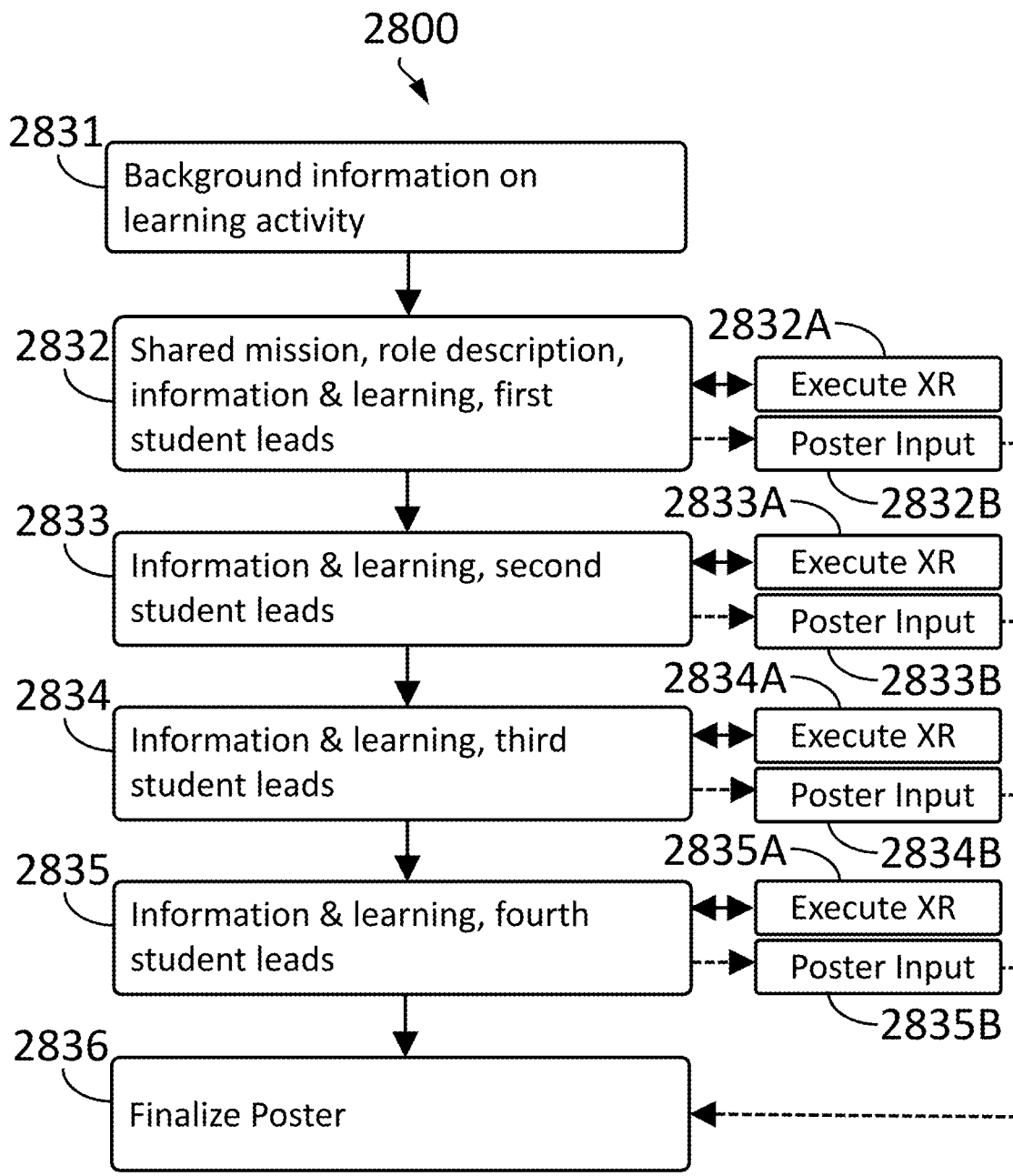
FIG. 28 illustrates a flow diagram for advancing through an educational module of the extended reality education system.

FIG. 28 illustrates a flow diagram for a method 2800 of advancing through an educational module of the extended reality education system. The method 2800 may integrate learning by incorporating an extended reality (XR) experience within the educational module in a way that engages all students, both the student(s) in the XR environment and the student(s) not in the XR environment.

At step 2831, students may receive background information on learning activities within the educational module. Students may access the background information through their respective digital science journals in a manner as described in this disclosure. Students may be assigned into working groups (e.g., four students per working group, as exemplified in FIG. 28). While the present disclosure contemplates working groups of 4 students, a person of ordinary skill in the art will appreciate that larger or smaller groups of students may be possible (e.g., groups of 2, 3, 4, or more students as may be desirable for the educational module). Assignments may be made at random by the software, may be edited by the educator and/or may be made by the educator. Step 2831 may occur in a first time period of learning (e.g., on a first day).

At step 2832, students may receive instructions regarding their shared mission, details and descriptions of their role in the shared mission, and specific information, learning and instruction in fulfilling their role. A first student assigned to a first role may take the lead on learning and/or engagement in a first XR experience.

At step 2832A, the first student from the group of students may be prompted to execute the first XR experience (e.g., enter a first XR environment and interact with points of interest within the first XR environment related to the first student's assigned role).

At step 2832B, the group of students may incorporate their learning onto their poster page (e.g., poster page exemplified by screenshot 4000, of FIG. 40). Students may be prompted to incorporate specific material onto their poster page. Students may not be prompted to incorporate specific material, and may exercise their own discretion in deciding what material to incorporate on their poster page. Steps 2832, 2832A and 2832B may occur in a second time period of learning (e.g., on a second day).

At step 2833, students may receive additional instructions, descriptions and learning to advance the students understanding beyond that presented in step 2832. A second student assigned to a second role may take the lead on learning and/or engagement in a second XR experience.

At step 2833A, the second student from the group of students may be prompted to execute the second XR experience (e.g., enter a second XR environment and interact with points of interest within the second XR environment related to the second student's assigned role).

At step 2833B, the group of students may incorporate their learning onto their poster page. Steps 2833, 2833A and 2833B may occur in a third time period of learning (e.g., on a third day).

At step 2834, students may receive additional instructions, descriptions and learning to advance the students understanding beyond that presented in step 2833. A third student assigned to a third role may take the lead on learning and/or engagement in a third XR experience.

At step 2834A, the third student from the group of students may be prompted to execute the third XR experience (e.g., enter a third XR environment and interact with points of interest within the third XR environment related to the third student's assigned role).

At step 2834B, the group of students may incorporate their learning onto their poster page. Steps 2834, 2834A and 2834B may occur in a fourth time period of learning (e.g., on a fourth day).

At step 2835, students may receive additional instructions, descriptions and learning to advance the students understanding beyond that presented in step 2834. A fourth student assigned to a fourth role may take the lead on learning and/or engagement in a fourth XR experience At step 2835A, the fourth student from the group of students may be prompted to execute the fourth XR experience (e.g., enter a fourth XR environment and interact with points of interest within the fourth XR environment related to the fourth student's assigned role).

At step 2835B, the group of students may incorporate their learning onto their poster page. Steps 2835, 2835A and 2835B may occur in a fifth time period of learning (e.g., on a fifth day).

At step 2836, students may navigate to their poster page (e.g., via a "P" icon on a toolbar of the extended reality education system), and may review the materials they have submitted to the poster page. In the event that materials are missing from the poster page, students may navigate through the educational module to find the desired materials and/or may select the missing material from a list (e.g., a bank of images) to add them to the poster page. Step 2836 may occur in the fifth time period of learning (e.g., on the fifth day). Thus, the educational module may span five time periods of learning (e.g., five days of learning).

While method 2800 exemplifies an educational module designed to allow four students to engage in an XR environment, a person of ordinary skill in the art will appreciate that the method can be easily modified to enable fewer or greater numbers of students to engage in the learning process. Further, while method 2800 has been described to span five time periods of learning, the educational module may be easily modified to enable fewer or greater numbers of time periods of learning (e.g., 1, 2, 3, 4, 5, 6, 7, 8, 9, or more time periods of learning).

Figure 29:
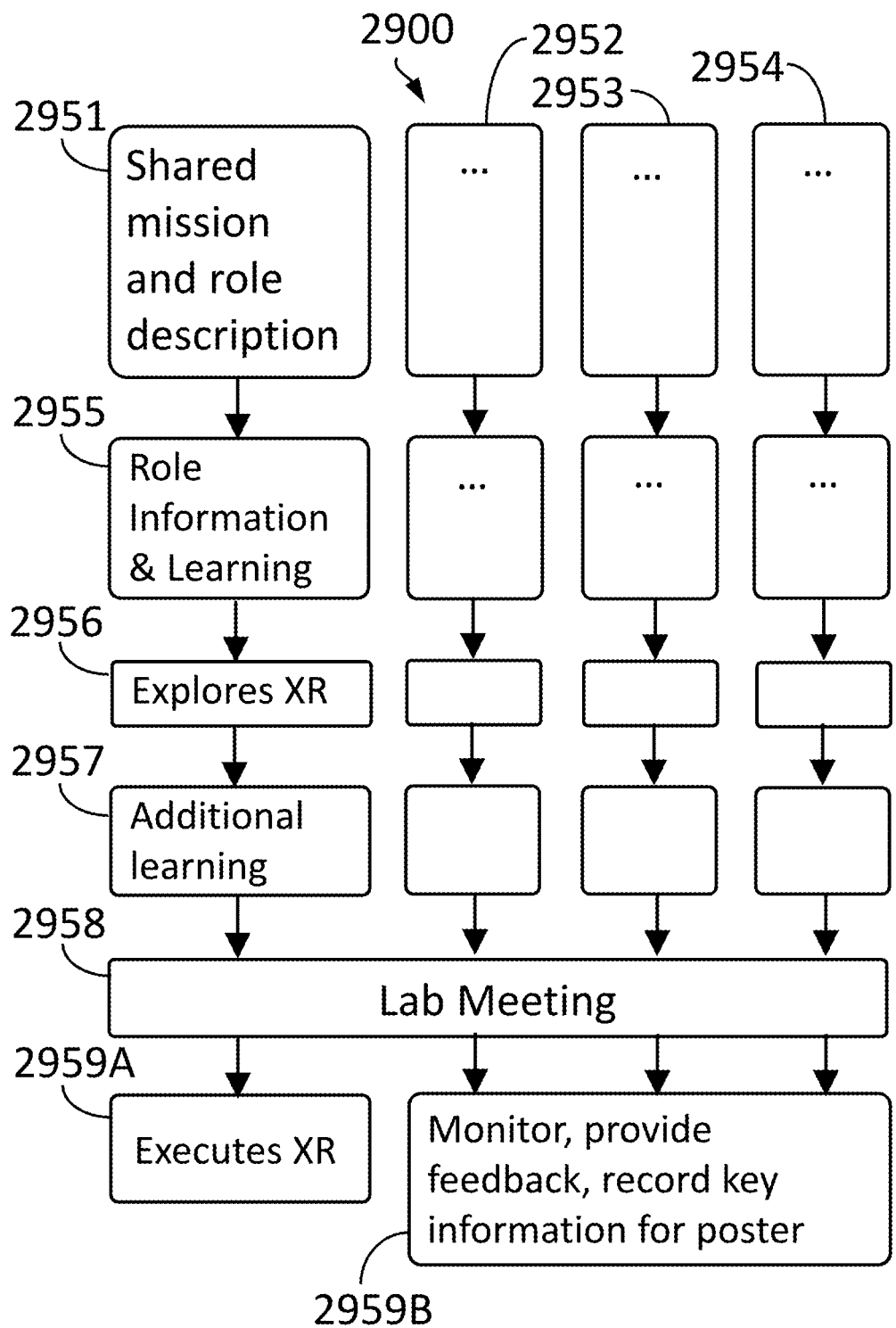
FIG. 29 illustrates a flow diagram for advancing through an educational module of the extended reality education system.

FIG. 29 illustrates a flow diagram for a method 2900 of advancing through an educational module of the extended reality education system, such as advancing through any one or more of steps 2832, 2833, 2834, and 2835 of FIG. 28). The method 2900 may integrate learning by incorporating an extended reality (XR) experience within the educational module and allowing student(s) not in the XR environment to engage with and/or interact with the student(s) in the XR environment. FIG. 29 illustrates four columns of steps, as exemplified by step 2951 (column 1), step 2952 (column 2), step 2953 (column 3), and step 2954 (column 4).

As indicated previously, students may be assigned into groups of four students (e.g., with each student assigned to fulfill a role within that group). A person of ordinary skill in the art will appreciate that groups of students may include fewer or greater numbers of students. It may be assumed that the steps across columns are similar (except for differences between the assigned roles of each student). Thus, in the first step of each column (2951, 2952, 2953, 2954) each of the four students will receive instruction on their shared mission and role description, but each student may receive a different role and therefore a description relevant to the role assigned. Each educational module may require different roles and/or a different number of roles (and therefore a different number of students to complete the group).

As an example, an educational module on venom may require a total of four roles, including a zoologist, a biochemist, a molecular biologist, and a pharmacologist. Thus, each student in the group may be assigned to one of these roles, and may experience learning specifically for the role assigned. Further, the steps in the first column (e.g., steps 2951, 2955, 2956, 2957, 2958, and 2959A) may be associated with a first of the roles (e.g., the zoologist role) corresponding with a first student, the steps in the second column with a second role (e.g., the biochemist role) corresponding with a second student, the steps in the third column with a third role (e.g., the molecular biologist role) corresponding with a third student, and the steps in the fourth column with a fourth role (e.g., the pharmacologist role) corresponding with a fourth student. Thus, the four students may follow independent paths of learning through the educational module. It is understood that the steps of each row exemplified in FIG. 29 are performed approximately simultaneously by the students.

At step 2951, the first student receives information regarding the shared mission and descriptions and explanations of the role assigned to the first student. The second, third, and fourth students receive similar instructions, but specific to their assigned roles (e.g., in steps 2952, 2953, 2954).

At step 2955, the first student receives information and learning specific to the assigned role (e.g., where the student has been assigned the zoologist role, the student completes pages of the educational module that are specific to the zoologist role). The second, third, and fourth students receive information and learning specific to their assigned roles.

At step 2956, on any given day, within each group of students, one student may be engaged in an AR activity while the remaining students in the group may be working on an activity in the digital science journal to gain an understanding of key concepts or perform tasks that their group needs to make progress.

At step 2957, additional learning activities may take place prior to the lab meeting. Upon completion of the specific learning, the students may be directed to a combined Lab Meeting.

At step 2958, the students enter a combined Lab Meeting. In the Lab Meeting the students may be able to compare notes and/or see each other's learning outcomes. After review thereof, the students may be prompted to reach a scientific conclusion or prompted with a question that requires consensus to make a decision about how to proceed with the educational module.

At step 2959A, a first student may be prompted to execute and/or may lead an XR experience (e.g., enter a first XR environment and interact with points of interest within the first XR environment related to the first student's assigned role, such as completing a task, collecting a venom sample and/or discovering a particular point of interest). The prompt may be provided only if the correct scientific conclusion is reached in step 2958.

At step 2959B, the second, third, and fourth students may remain in their respective digital science journals, and may monitor the activities of the first student while in the first XR environment. The second, third, and fourth students may interact within the digital science journal which provides feedback to the first student while within the first XR environment. The first student may interact with points of interest within the first XR environment which provides feedback to the second, third, and fourth students. Key information, such as screenshots or images captured within the first XR environment may be recorded, sent to the server (e.g., server 360 of FIG. 3), and displayed within the digital science journal of the first, second, third, and fourth students (e.g., on the poster page).

Though not specifically shown, it is understood that method 2900 of FIG. 29 may be repeated (e.g., as steps 2833, 2834, 2835 of FIG. 28 are repeats of step 2832). Thus, in a first repeat of method 2900, a second student may be prompted to execute a second XR experience (e.g., after completing step 2958), and the first, third, and fourth students may remain in their respective digital science journals to monitor, provide feedback and record key information. In a second repeat of method 2900, a third student may be prompted to execute a third XR experience, and the first, second, and fourth students may remain in their respective digital science journals to monitor, provide feedback and record key information. In a third repeat of method 2900, a fourth student may be prompted to execute a fourth XR experience, and the first, second, and third students may remain in their respective digital science journals to monitor, provide feedback and record key information.

FIGS. 30, 31, 32, 33, and 34 illustrate screenshots 3000, 3100, 3200, 3300, and 3400, respectively, taken from an extended reality education system showing features of the educational module (e.g., as presented within the digital science journal). Icons from the toolbar may be displayed consistently within the digital science journal (e.g., along the left side of the screen). Module progress may be displayed consistently (e.g., along the top of the screen). Other icons may be displayed consistently (e.g., a down arrow to progress to the next page of the educational module). Yet a student may not be allowed to proceed to the next page until all interactions have been completed for the current page. A student may receive learning objectives for the shared mission and/or for the assigned role. Further students may receive instruction specific to the assigned role.

Students may interact with the learning of the module, such as by watching a video (exemplified in FIGS. 30 and 34), listening to audio, reading text, building a model (exemplified by the drag-and-drop feature of FIGS. 31 and 32), separating component parts (exemplified by the drag-and-drop feature of FIG. 33 for separating molecules, proteins and peptides), and so forth.

Figure 34:
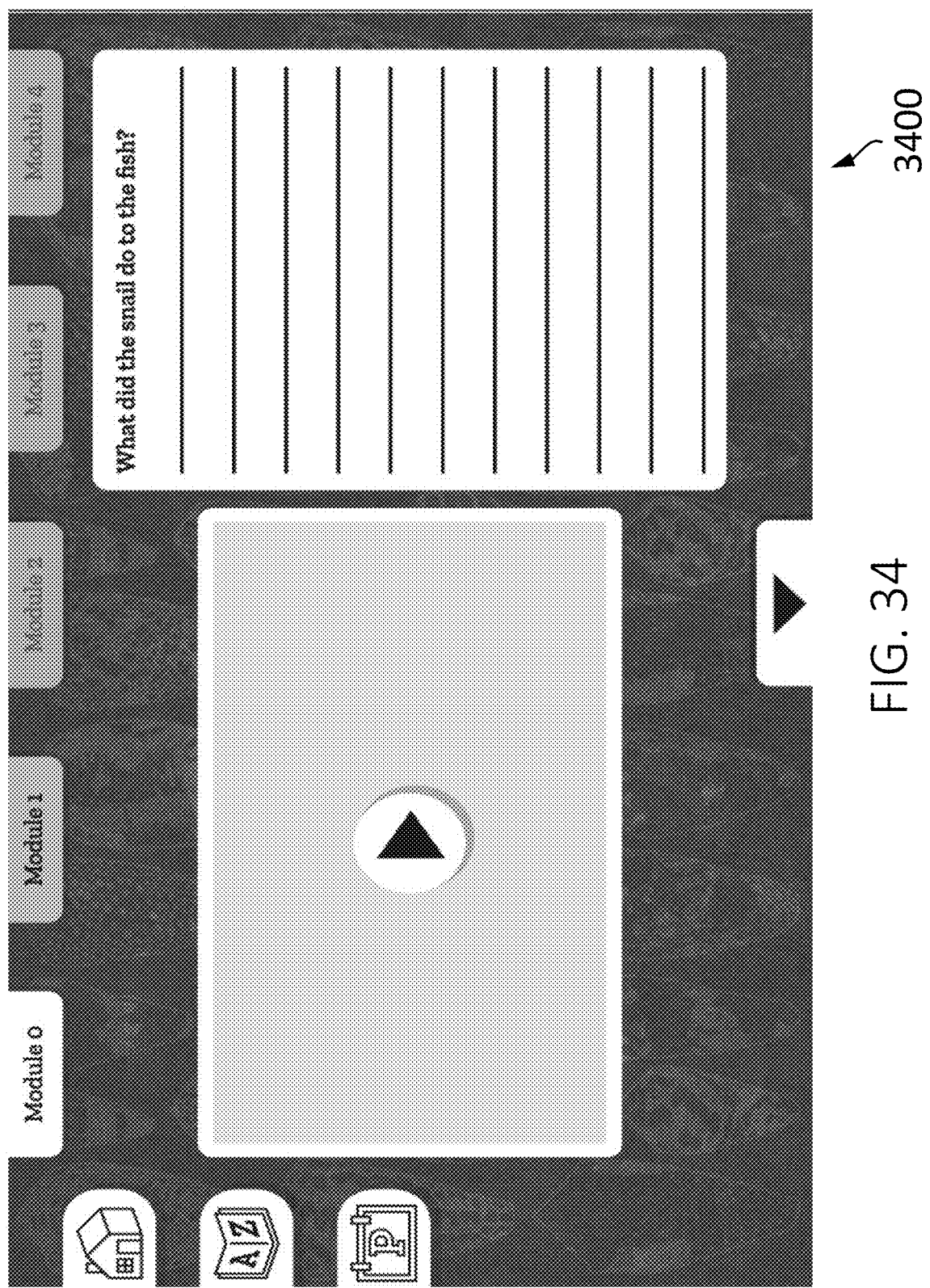
FIG. 34 illustrates a screenshot of an extended reality education system.
Figure 35:
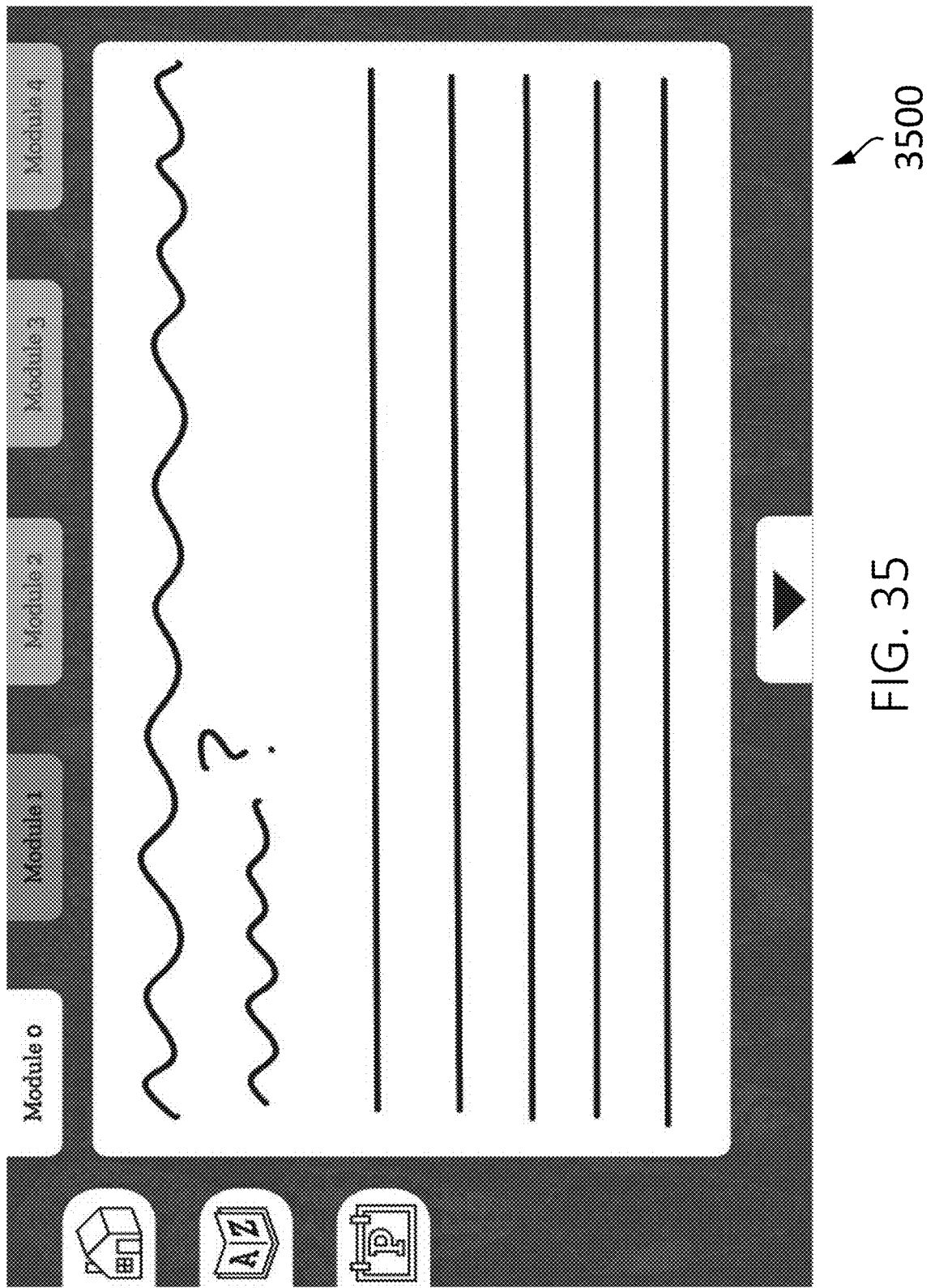
FIG. 35 illustrates a screenshot of an extended reality education system.
Figure 36:
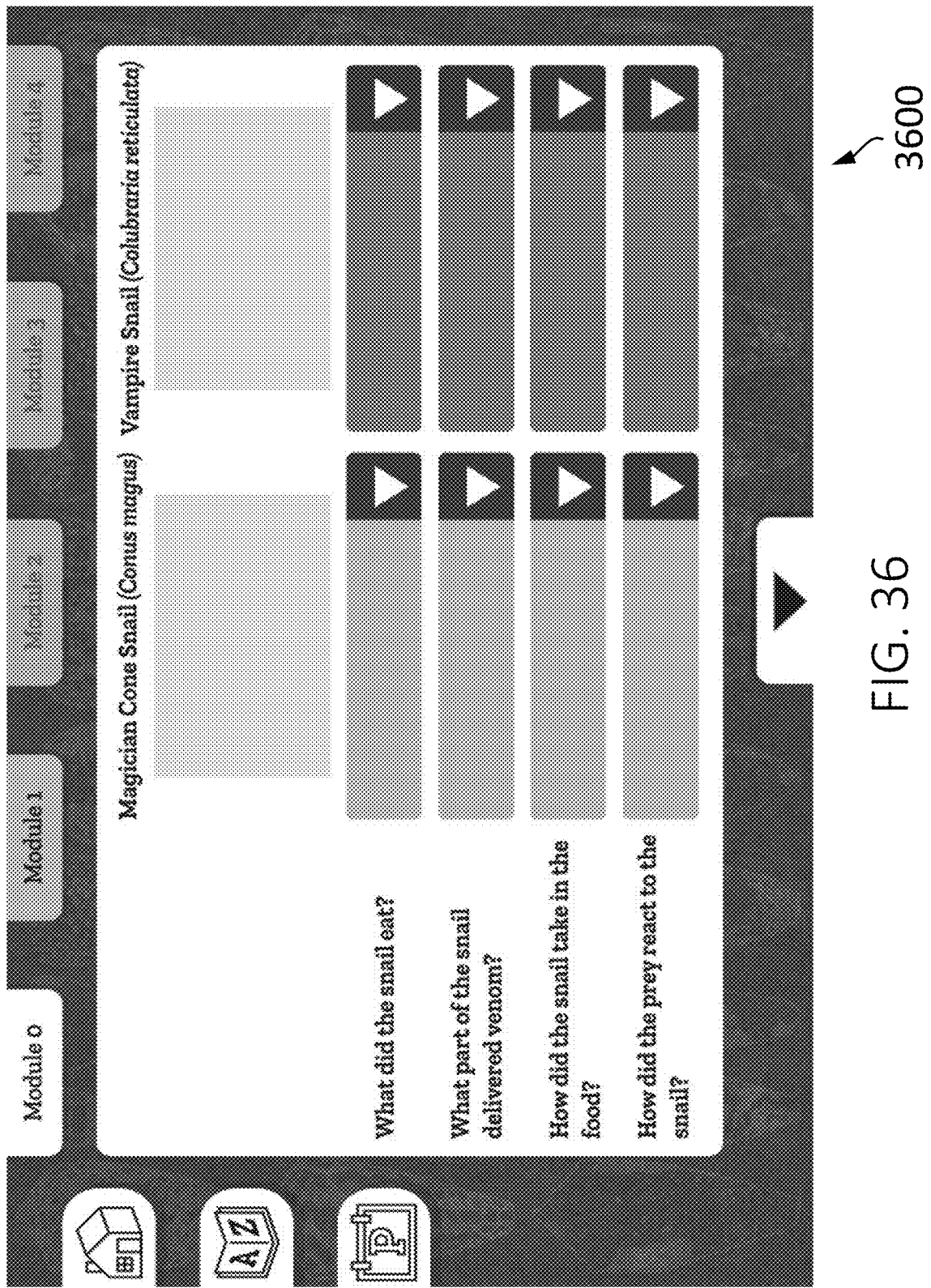
FIG. 36 illustrates a screenshot of an extended reality education system.

FIGS. 34, 35, and 36 illustrate screenshots 3400, 3500, and 3600, respectively, showing opportunities for student interaction within the extended reality education system. Students may be required to answer questions, form hypotheses, or arrive at conclusions about their learning (exemplified in FIGS. 34, 35, 36), such as by typing answers, selecting options from drop-down lists, or otherwise making selections.

Figure 30:
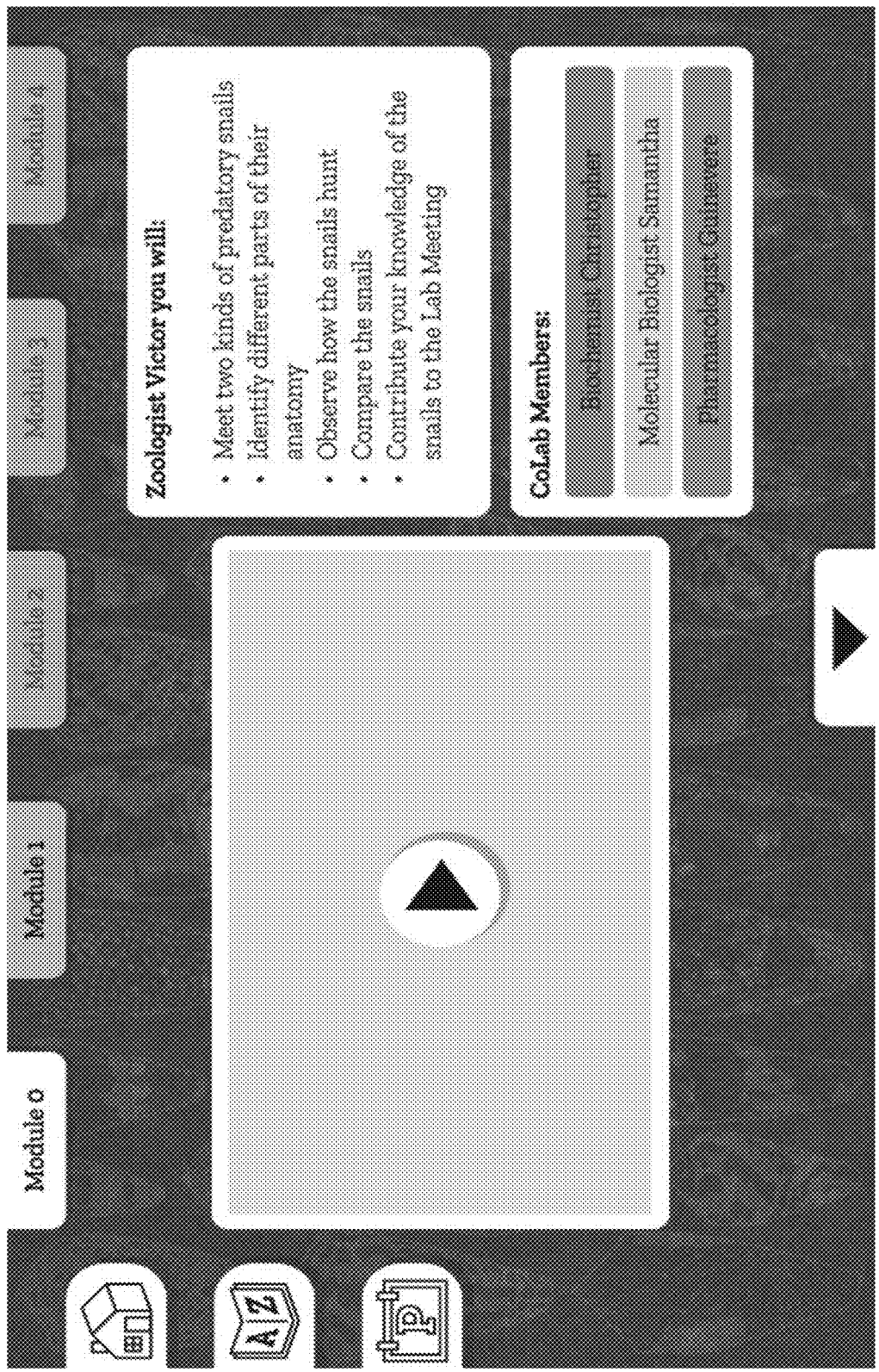
FIG. 30 illustrates a screenshot of an extended reality education system.
Figure 31:
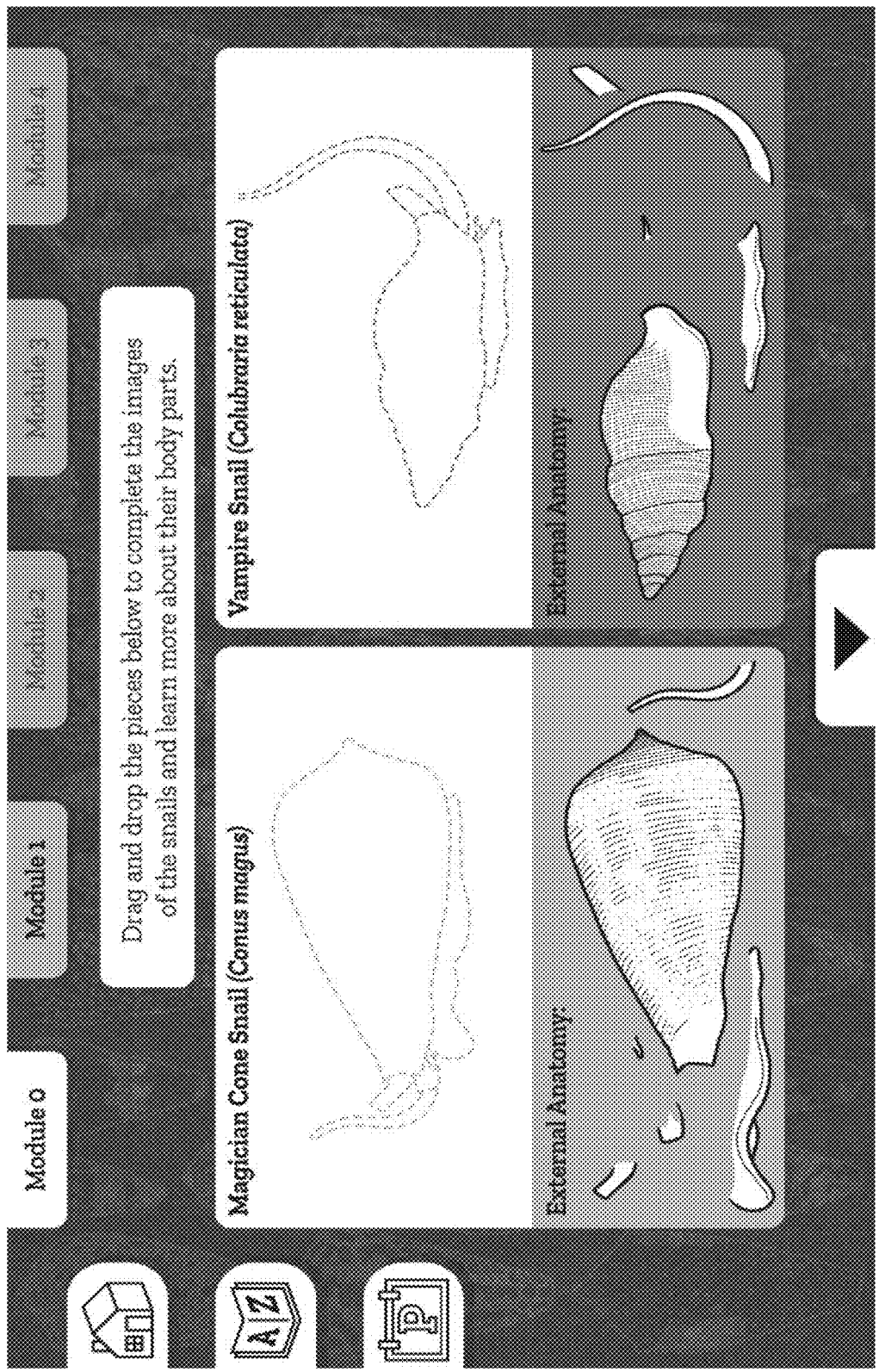
FIG. 31 illustrates a screenshot of an extended reality education system.
Figure 32:
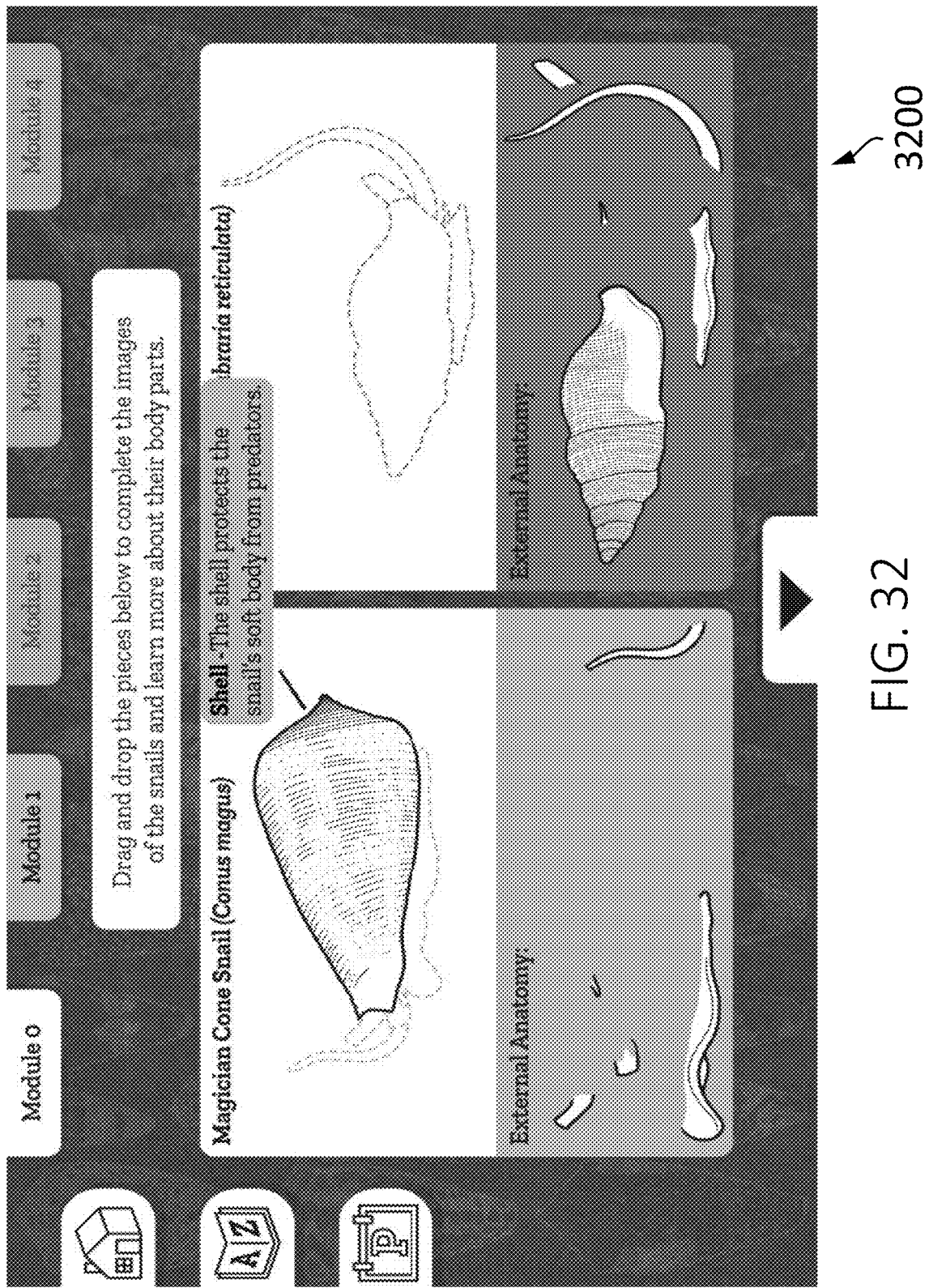
FIG. 32 illustrates a screenshot of an extended reality education system.
Figure 33:
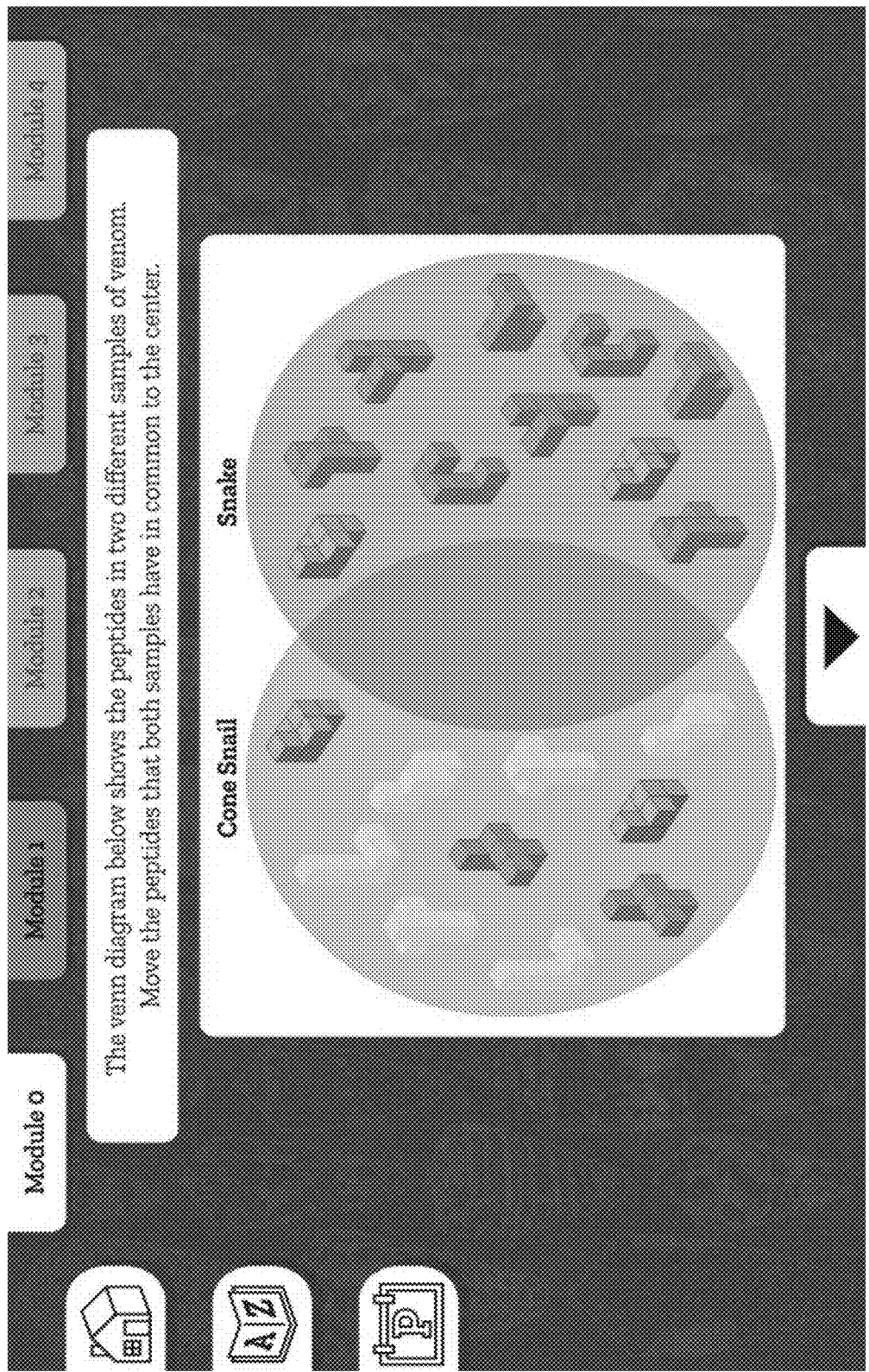
FIG. 33 illustrates a screenshot of an extended reality education system.

FIG. 30 may exemplify a portion of the educational module correlating to step 2951 of FIG. 29. FIGS. 31, 32, 33, 34, 35, and 36 may exemplify portions of the educational module correlating to step 2955 of FIG. 29.

Figure 37:
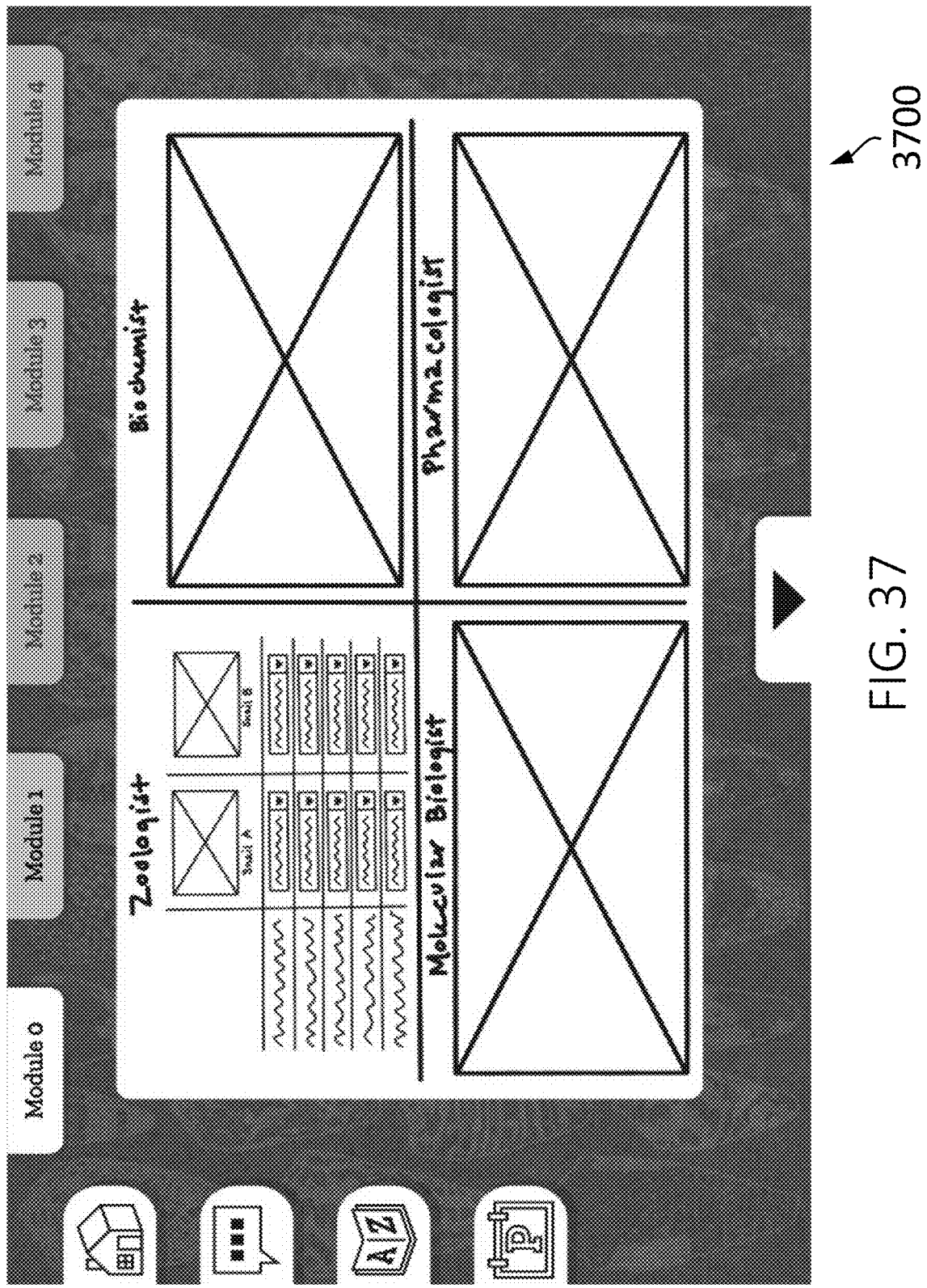
FIG. 37 illustrates a screenshot of an extended reality education system.

FIG. 37 illustrates a screenshot 3700 taken from an extended reality education system showing features of the educational module (e.g., as presented within the digital science journal). FIG. 37 may exemplify a portion of the educational module correlating to the Lab Meeting (e.g., step 2956 of FIG. 29). Students may wait at a landing page until all students have completed the learning for their assigned role, or students may enter the Lab Meeting and wait for the remaining students to complete the learning for their assigned role. Thus, once all the students have completed the learning for their assigned role the students may be presented with a summary of each students' learnings, findings and/or conclusions (e.g., the work of a student assigned to the zoologist role may have their work displayed in a first quadrant of the page, such as the responses to exit questions for the assigned role, or conclusions arrived at in FIG. 36). While the specific format of the findings isn't represented with any detail, a person of ordinary skill in the art will appreciate that the findings of each assigned role may be suitably summarized in a common Lab Meeting to be visible to all of the students in the group.

The students may have the opportunity to review each other's responses and to discuss the responses with each other. While it is understood that the students are likely sitting together in a common space (e.g., a classroom), this need not be the case. The digital science journal may include communication features to enable remote communication between the students in the group. Thus the present invention seeks to implement a jigsaw learning methodology where the students learn separately, then come together to collaborate and make decisions as a group.

The extended reality education system may make adjustments where there are too few students to fill all of the assigned roles, whether resulting from not enough students in the class, students being absent due to illness or other excuse, or reassignment by the educator to another group. Stock answers may be provided for any unfilled role (e.g., on the Lab Meeting screen), such that students may be able to review conclusions for the role. Students may be assigned two roles until all roles are completely filled to ensure that all conclusions are presented (e.g., on the Lab Meeting screen).

Figure 38:
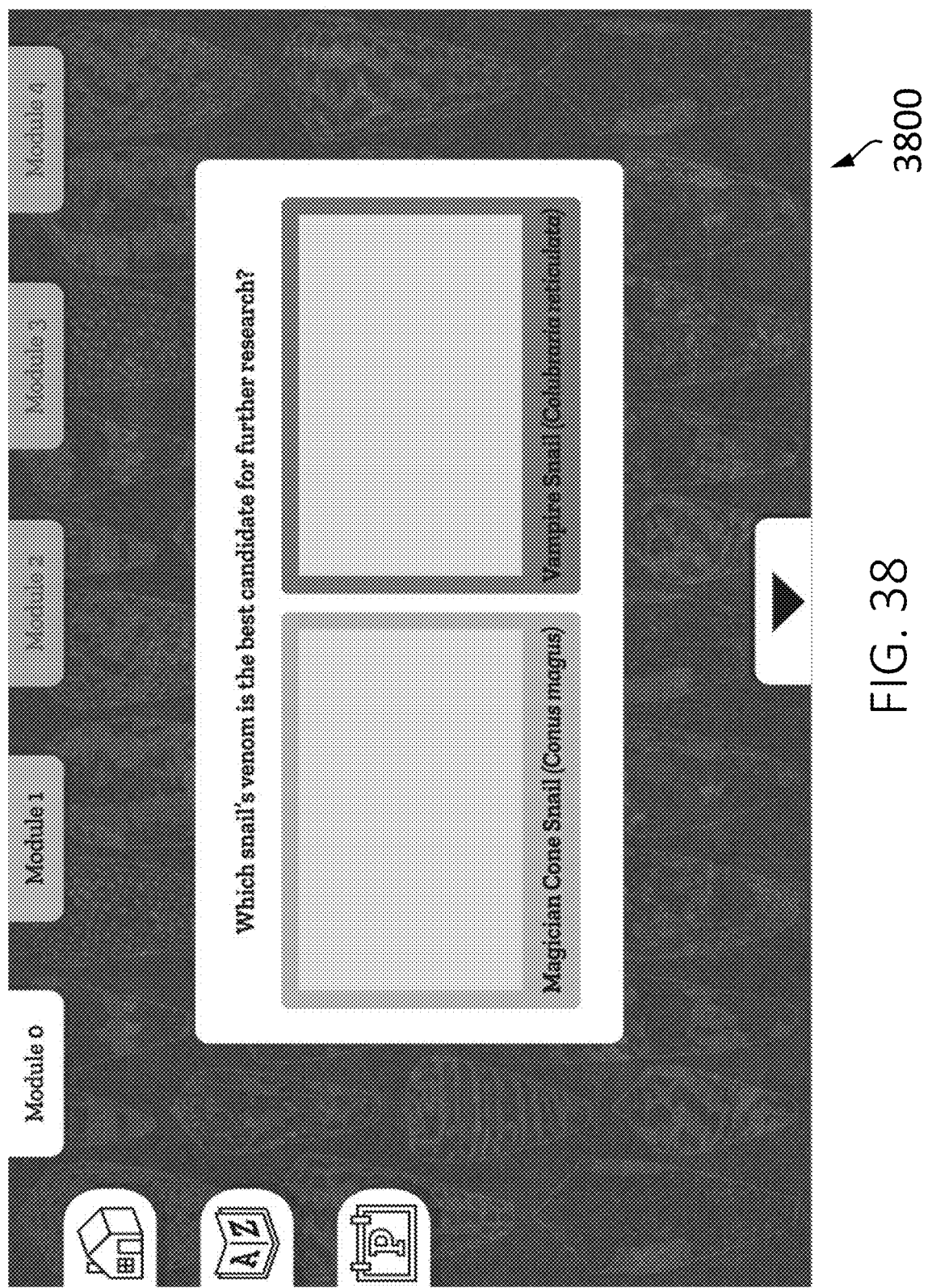
FIG. 38 illustrates a screenshot of an extended reality education system.

FIG. 38 illustrates a screenshot 3800 taken from an extended reality education system showing a decision gateway of the educational module (e.g., the students may be required to make a decision in order to proceed beyond the Lab Meeting). The students may be required to decide unanimously. Making the correct decision may require the students to rely on each other's learning and conclusions. Upon making an incorrect decision, students may be redirected back to the Lab Meeting to re-review their conclusions and may be given additional material to assist in the decision making process. Upon making the correct decision, at least one student may be prompted to launch the XR environment (e.g., as exemplified in FIG. 8).

Figure 39:
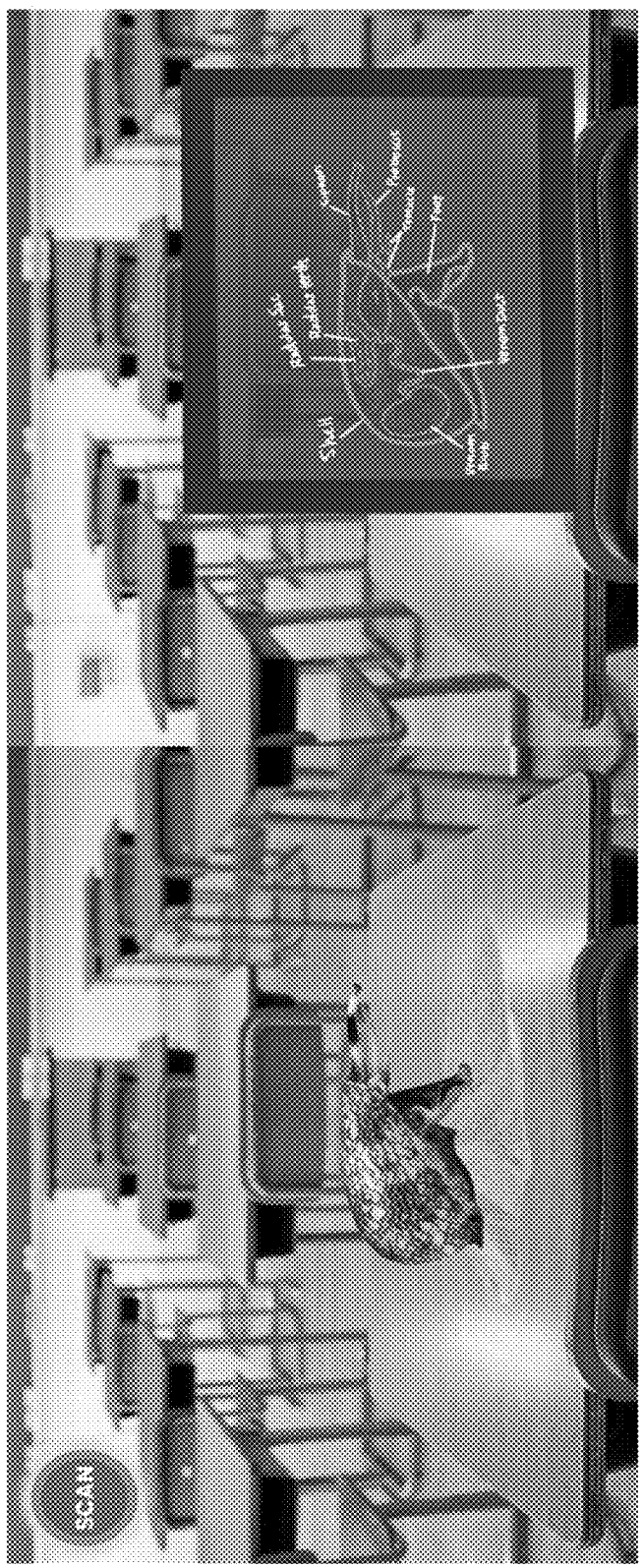
FIG. 39 illustrates a screenshot of an extended reality education system.

FIG. 39 illustrates two screenshots 3900 taken from an extended reality education system exemplifying the XR environment experienced by a student. The student may be prompted to interact with points of interest within the XR environment to complete tasks (e.g., identify specimens, collect samples, and so forth).

FIG. 40 illustrates a screenshot 4000 exemplifying a poster page of the extended reality education system. The poster page may be a common page for all students in the assigned group. Each student in the group may be able to contribute to the content on the poster page. Each student in the group may be required to contribute to the content on the poster page. Where a group is not completely full, stock material may be provided for any unfilled role. Students may be able to direct material from the educational modules to the poster page. Students may be able to select material from a list or bank of images to be included on the poster page. Students may be limited to adding only material from their assigned role. Students may be free to add material from any assigned role. Where students have failed to add key information to the poster page, students may be prompted to collect specific information and add it to the poster page. A module may be complete once the poster page has been completed for that module.

Other aspects will be apparent to those skilled in the art from consideration of the specification and practice disclosed herein. It is intended, therefore, that the specification and illustrated embodiments be considered as examples only.

What is claimed is:

1. A learning system, comprising:
    a server having software for operating the learning system;
    an XR enabled device capable of enabling a user to view and interact with an extended reality environment, the XR enabled device sending and receiving communications to and from the server;
    a student device capable of accessing and displaying a digital science journal, the student device sending and receiving communications to and from the server;
    an assessment device capable of accessing and displaying an educator dashboard, the assessment device sending and receiving communications to and from the server;
    wherein interactions occurring in the extended reality environment are communicated to the server as they occur;
    wherein interactions occurring in the digital science journal are communicated to the server as they occur;
    wherein updates regarding interactions in the extended reality environment are polled by the assessment device and communicated from the server in real time; and
    wherein updates regarding interactions in the digital science journal are polled by the assessment device and communicated from the server in real time.

2. The learning system of claim 1, wherein the extended reality environment includes one or more of augmented reality, mixed reality, and virtual reality.

3. The learning system of claim 1, wherein a wireless network facilitates communication between the server, the XR enabled device, the student device, and the assessment device.

4. The learning system of claim 1, wherein the XR enabled device generates the extended reality environment independently of the student device.

5. A method of interactive learning, the method comprising:
    equipping a server with software for conducting interactive learning;
    activating an XR enabled device to view and interact with an extended reality environment, the XR enabled device sending and receiving communications to and from the server;
    activating a student device to view and interact with a digital science journal, the student device sending and receiving communications to and from the server;
    activating an assessment device to view and interact with an educator dashboard, the assessment device sending and receiving communications to and from the server;
    communicating interactions occurring in the extended reality environment to the server as they occur;
    communicating interactions occurring in the digital science journal to the server as they occur; and
    polling the server for updates regarding interactions occurring in the digital science journal and in the extended reality environment and communicating the updates to the assessment device in real time.

6. The method of claim 5, further including generating the extended reality environment with the XR enabled device.

7. The method of claim 5, further including providing the digital science journal with one or more modules for topic-based interactive learning.

8. The method of claim 7, further including providing the one or more modules for topic-based interactive learning with one or more pages of content.

9. The method of claim 8, wherein during interactive learning, interactions with the one or more pages and corresponding to the one or more modules are communicated to the server as they occur, and wherein the interactions are tabulated on the educator dashboard.

10. The method of claim 8, wherein time spent on each of the one or more pages is tracked and communicated to the server, and wherein the time spent on each of the one or more pages is tabulated on the educator dashboard.

11. The method of claim 8, wherein at least one of the one or more pages prompts for the activation of the XR enabled device.

12. The method of claim 11, wherein during interactive learning, interactions within the extended reality environment are communicated to the server as they occur, and wherein the interactions are tabulated on the educator dashboard.

13. A method of interactive learning, the method comprising:
    equipping a server with software for conducting interactive learning;
    activating an XR enabled device to view and interact with an extended reality environment;
    activating a student device to view and interact with a digital science journal;
    activating an assessment device to view and interact with an educator dashboard;
    communicating interactions occurring in the extended reality environment to the server;
    communicating interactions occurring in the digital science journal to the server; and
    polling the server for updates regarding interactions occurring in the extended reality environment and in the digital science journal and communicating the updates to the assessment device.

14. The method of claim 13, further including polling the server for updates regarding interactions and communicating the updates to the educator dashboard.

15. The method of claim 13, wherein during interactive learning, interactions on the digital science journal are communicated to and are tabulated on the educator dashboard.

16. The method of claim 15, wherein the interactions are tabulated based on a student name and a page of the digital science journal where the interaction took place.

17. The method of claim 15, wherein a symbol may appear in the tabulation to indicate a message has been communicated from the digital science journal to the educator dashboard.

18. The method of claim 13, wherein the digital science journal includes a first messaging system, wherein the educator dashboard includes a second messaging system, and wherein the first and second messaging systems communicate to allow messages to be sent from the digital science journal to the educator dashboard and from the educator dashboard to the digital science journal.

19. The method of claim 18, wherein a symbol may appear in an icon of a toolbar in the digital science journal to indicate a message has been communicated from the educator dashboard to the digital science journal.

20. The method of claim 13, wherein the extended reality environment includes one or more of augmented reality, mixed reality, and virtual reality.

* * * * *